US006697588B2

(12) United States Patent
Nakazato et al.

(10) Patent No.: US 6,697,588 B2
(45) Date of Patent: Feb. 24, 2004

(54) IMAGE FORMING APPARATUS

(75) Inventors: Yasushi Nakazato, Setagaya-ku (JP); Kazuyuki Shimada, Chofu (JP); Tomohiro Nakajima, Machida (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 10/419,902

(22) Filed: Apr. 22, 2003

(65) Prior Publication Data

US 2003/0198482 A1 Oct. 23, 2003

Related U.S. Application Data

(62) Division of application No. 10/160,066, filed on Jun. 4, 2002, now Pat. No. 6,580,887, which is a continuation of application No. 09/805,246, filed on Mar. 14, 2001, now Pat. No. 6,400,917, which is a division of application No. 09/305,275, filed on May 5, 1999, now Pat. No. 6,236,820.

(30) Foreign Application Priority Data

| | | |
|---|---|---|
| May 7, 1998 | (JP) | 10-124640 |
| May 12, 1998 | (JP) | 10-128728 |
| Apr. 7, 1999 | (JP) | 11-099724 |

(51) Int. Cl.[7] ......................... G03H 15/00; G03H 21/16

(52) U.S. Cl. ....................... 399/111; 347/138; 347/245; 399/110; 399/118

(58) Field of Search ................................ 399/110, 111, 399/112, 107, 118, 126, 178, 179, 177; 347/138, 152, 245, 263, 232, 257

(56) References Cited

U.S. PATENT DOCUMENTS

| | | | | |
|---|---|---|---|---|
| 5,208,640 A | | 5/1993 | Horie et al. | |
| 5,752,137 A | | 5/1998 | Haneda | |
| 5,787,324 A | | 7/1998 | Iwasaki | |
| 5,842,095 A | | 11/1998 | Kitamura | |
| 5,848,329 A | | 12/1998 | Aoyama et al. | |
| 5,907,749 A | | 5/1999 | Nomura et al. | |
| 5,953,559 A | | 9/1999 | Obu | |
| 6,191,801 B1 | | 2/2001 | Hiraoka et al. | |
| 6,236,820 B1 | | 5/2001 | Nakazato et al. | |
| 6,249,305 B1 | | 6/2001 | Miyamoto et al. | |
| 6,400,917 B2 | | 6/2002 | Nakazato et al. | |
| 6,453,135 B1 | * | 9/2002 | Sameshima et al. | 399/110 |
| 6,466,754 B2 | | 10/2002 | Nakazato et al. | |
| 6,483,527 B2 | * | 11/2002 | Kaneko et al. | 347/138 |
| 2003/0160856 A1 | * | 8/2003 | Araki et al. | 347/138 |

* cited by examiner

*Primary Examiner*—Susan S. Y. Lee
(74) *Attorney, Agent, or Firm*—Oblon, Spivak, McClelland, Maier & Neustadt, P.C.

(57) ABSTRACT

An image forming apparatus including a plurality of image forming cartridges removably mounted to an apparatus body one above the other is disclosed. Structural members each partition off a space between nearby image forming cartridges mounted to the apparatus body. The apparatus is capable of obviating banding ascribable to the vibration of the cartridges.

27 Claims, 36 Drawing Sheets

MOUNTING & DISMOUNTING
22a
22b
22e
22f
25
30
15K' 15K
15C' 15C
15M' 15M
15Y' 15Y
8K' 8C' 8M' 8Y'
16K 17K
16C 17C
16M 17M
16Y 17Y
4 5 6 7
12K 8K 10K 11K 17K
12C 8C 10C 11C 17C
12M 8M 10M 11M 17M
12Y 8Y 10Y 11Y 17Y
9K 13K 14K 16K
9C 13C 14C 16C
9M 13M 14M 16M
9Y 13Y 14Y 16Y
Lb

IMAGE FORMING APPARATUS

This application is a divisional application under 37 C.F.R. §153(b) of parent application Ser. No. 10/160,066, filed on Jun. 4, 2002 is now U.S. Pat. No. 6,580,887, which is a continuation application of Ser. No. 09/805,246, filed on Mar. 14, 2001 now U.S. Pat. No. 6,400,917, now patented which is a divisional application of Ser. No. 09/305,275, filed on May 5, 1999 is now U.S. Pat. No. 6,236,820, now patented and includes non-elected claim 1 of the parent application.

BACKGROUND OF THE INVENTION

The present invention relates to an image forming apparatus including a plurality of image forming cartridges arranged one above the other and a plurality of optical writing means arranged one above the other or a single optical writing means.

There has been known an image forming apparatus of the type including an apparatus body and a plurality of image forming cartridges removably mounted to the apparatus body one above the other, or stacked, in the direction of gravity. This type of image forming apparatus forms an image with image forming means when the image forming cartridges are mounted to the apparatus body. Photoconductive elements each are supported by either one of the respective image forming cartridge or the apparatus body beforehand. In the case where the photoconductive elements are supported by the apparatus body, the image forming means arranged on the cartridges contact the photoconductive elements when the cartridges are mounted to the apparatus body.

The prerequisite with the image forming apparatus of the type described is that the image forming cartridges removable from the apparatus body be stably positioned on the apparatus body. Should the cartridges be unstable in position, so-called banding would occur in an image due to the vibration of a driveline. Further, optical writing means are stacked one above the other and respectively associated with the cartridges. The optical writing means are also susceptible to the vibration of the driveline, aggravating the banding.

SUMMARY OF THE INVENTION

It is therefore an object of the present invention to provide an image forming apparatus capable of obviating banding ascribable to the vibration of image forming cartridges and that of optical writing means.

In accordance with the present invention, an image forming apparatus for forming an image on a photoconductive element with image forming means includes an apparatus body, a plurality of image forming cartridges removably mounted to the apparatus body in the form of a stack, and a structural member for partitioning off the space between nearby image forming cartridges mounted to the apparatus body. A of photoconductive elements each are supported by the respective image forming cartridge beforehand, or the photoconductive elements are supported by the apparatus body beforehand such that when the image forming cartridges are mounted to the apparatus body, the image forming means supported by the image forming cartridges beforehand each partly contact the associated photoconductive element.

Also, in accordance with the present invention, an image forming apparatus includes an apparatus body, and a plurality of optical writing means stacked one above the other and each being mounted on a respective base member supported by the apparatus body. Adjusting means is included in at least one of the optical writing means for correcting the shift of a scanning line relative to the scanning lines of the other optical writing means. A structural member partitions off the space between the optical writing means including the adjusting means and the optical writing means adjoining it. The structural member is affixed to the apparatus body at a part thereof.

Further, in accordance with the present invention, an image forming apparatus includes an apparatus body, and a plurality of photoconductive elements mounted on the apparatus body one above the other. A plurality of optical writing means each form a latent image on a respective photoconductive element. The optical writing means are constructed into a single box-like writing unit for emitting a plurality of light beams toward the photoconductive elements. The writing unit is spaced from the photoconductive elements by a preselected distance.

Moreover, in accordance with the present invention, an image forming apparatus for forming an image on a photoconductive element with image forming means includes an apparatus body, a plurality of image forming cartridges removably mounted to the apparatus body in the form of a stack, and a plurality of optical writing means each for forming a latent image on a photoconductive element associated therewith. A plurality of photoconductive elements each are supported by a respective one of the plurality of image forming cartridges beforehand, or the photoconductive elements are supported by the apparatus body beforehand such that when the image forming cartridges are mounted to the apparatus body, the image forming means supported by the image forming cartridges beforehand each partly contact associated one of the photoconductive elements. The optical writing means are constructed into a single box-like writing unit for emitting a plurality of light beams toward the photoconductive elements in a stacking direction of the image forming cartridges. The writing unit is spaced from the photoconductive elements by a preselected distance.

BRIEF DESCRIPTION OF THE DRAWINGS

The above and other objects, features and advantages of the present invention will become more apparent from the following detailed description taken with the accompanying drawings in which.

DESCRIPTION OF THE PREFERRED EMBODIMENTS

Figure 44:
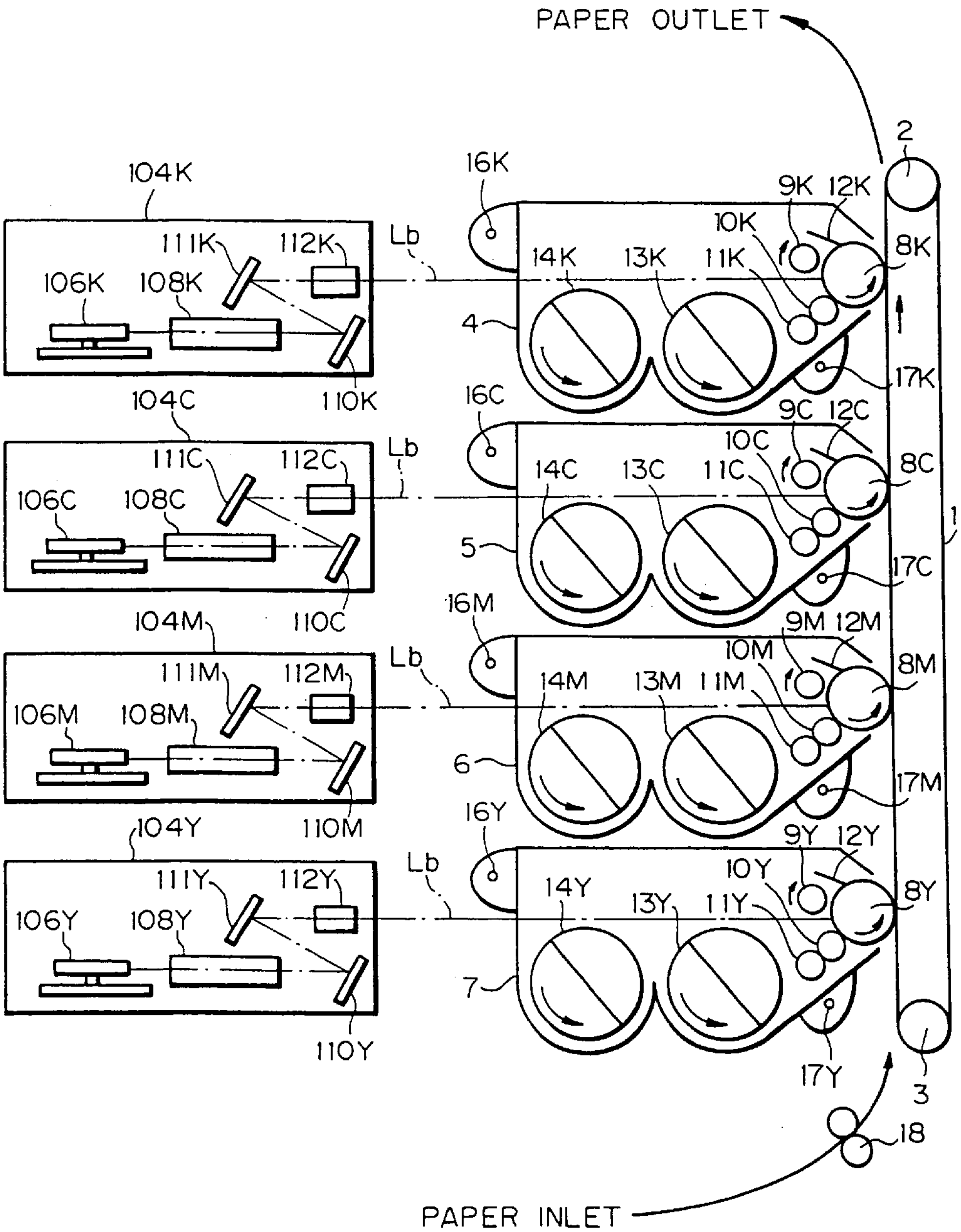
FIG. 44 is a fragmentary front view of a conventional image forming apparatus.

To better understand the present invention, reference will be made to a conventional image forming apparatus capable of forming a full-color image with a plurality of image forming cartridges, shown in FIGS. 44–46. As shown in FIG. 44, an image transfer belt (simply belt hereinafter) 1 is passed over rollers 2 and 3 and extends in the up-and-down direction. At the time of image formation, the belt 1 turns in such a direction that its surface for retaining a paper or similar recording medium moves upward, as indicated by an arrow in FIG. 44.

Four image forming cartridges (simply cartridges hereinafter) 4, 5, 6 and 7 are arranged one above the other and face the above surface of the belt 1 moving upward. The cartridges 4–7 are assumed to store black (K) toner, cyan (C) toner, magenta (M) toner and yellow (Y) toner, respectively. The cartridges 4–7 are identical in mechanical construction and therefore in members constituting them. Let the following description concentrate on the cartridge 5 by way of example. The other cartridges 4, 6 and 7 are simply distinguished from the cartridge 5 by suffices Y, M and K attached to the reference numerals.

The cartridge 5 includes a photoconductive element in the form of a drum 8C and image forming means for forming an image on the drum 8C. The image forming means includes a charge roller 9C, a developing roller 10C and a cleaning blade 12C arranged around the drum 8C. The charge roller 9C plays the role of charging means. The developing roller or developing means feeds toner to the drum 8C. The cleaning blade 12C removes toner left on the drum 8C after image transfer.

A supply roller 11C is associated with the developing roller 10C for supplying a developer to the roller 10C. Rotary bodies 13C and 14C convey the developer toward the supply roller 11C while agitating it. Optical writing means 104C, which will be described later, emits a light beam Lb to an image writing position on the drum 9C between the charge roller 9C and the developing roller 10C.

Figure 45:
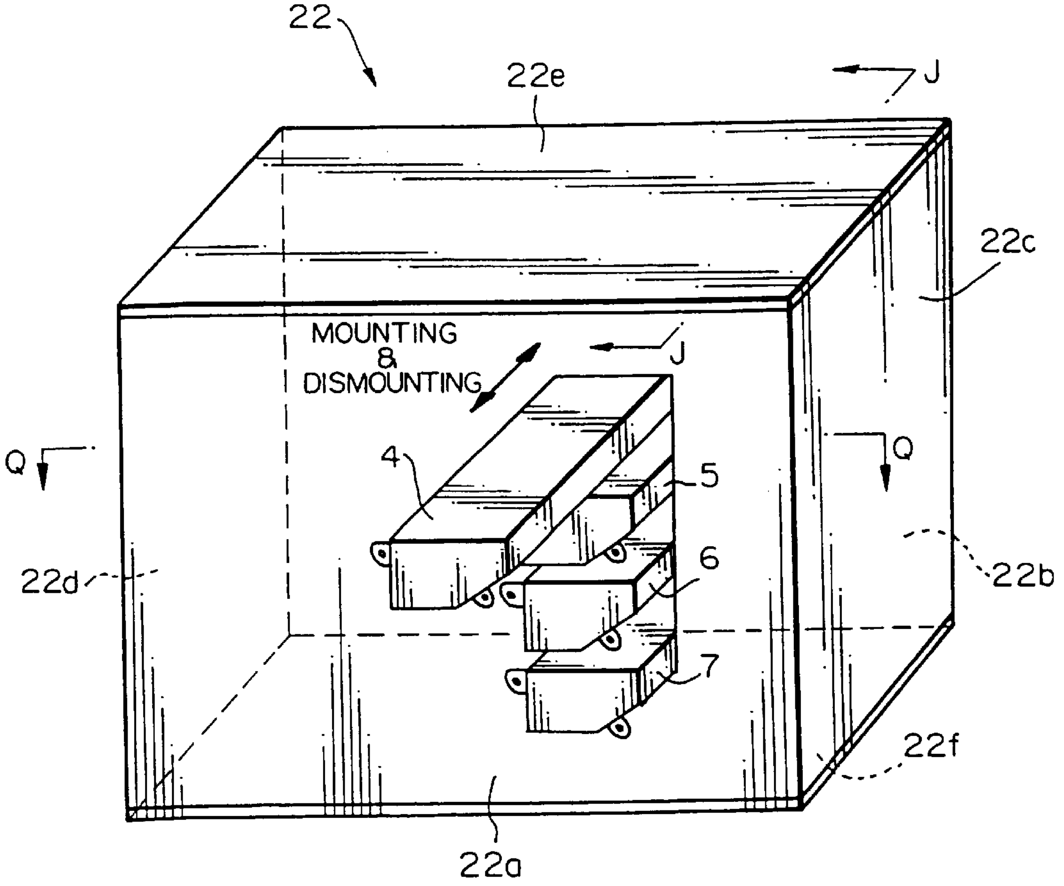
FIG. 45 is an external perspective view of the conventional image forming apparatus.
Figure 46:
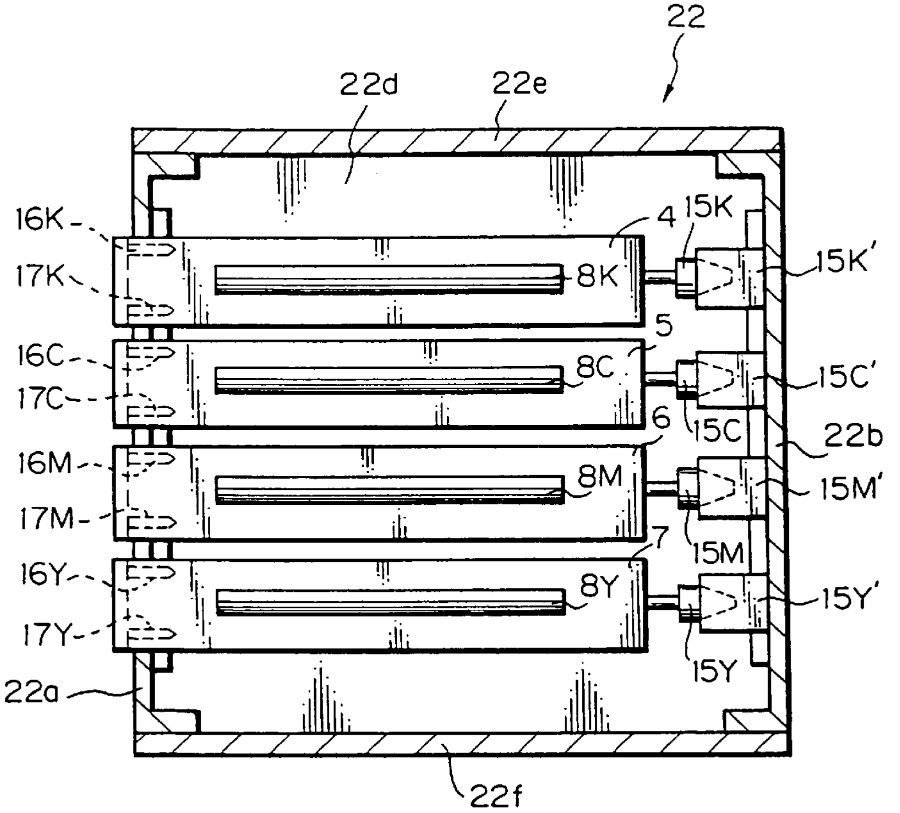
FIG. 46 is a section along line J—J of FIG. 45.
Figure 47:
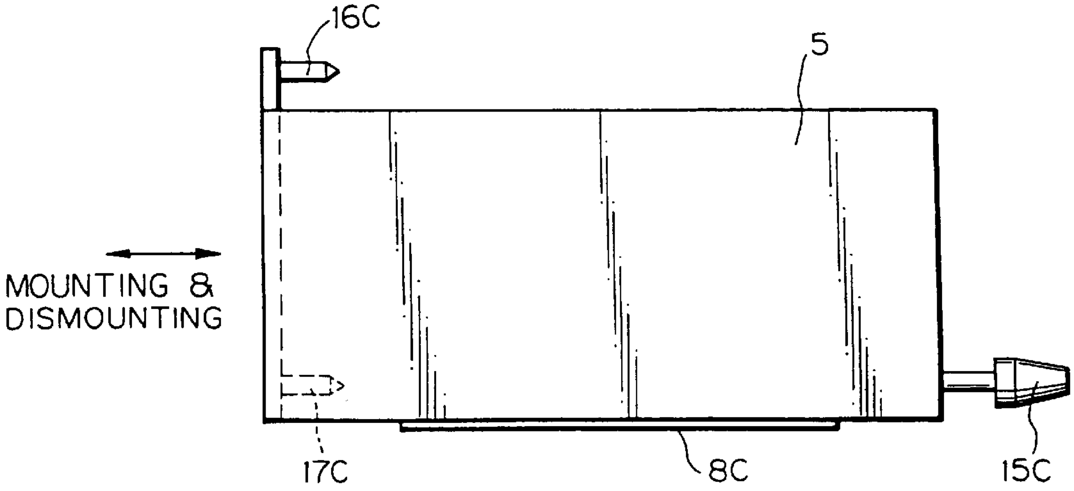
FIGS. 47 and 48 are respectively a plan view and a side elevation showing an image forming cartridge included in the conventional apparatus.
Figure 48:
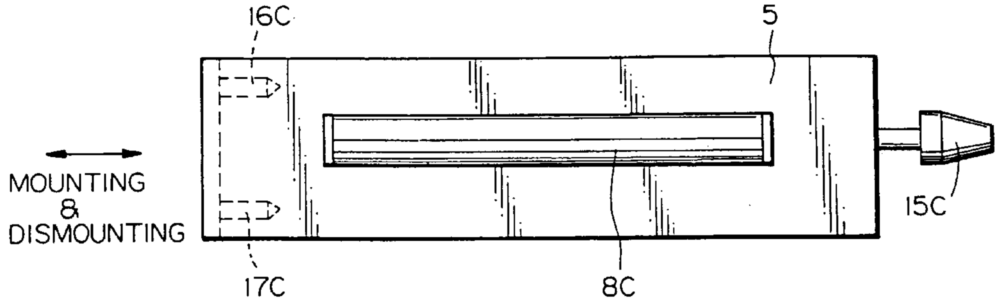

As shown in FIG. 45, the cartridges 4–7 are removably mounted to an apparatus body 22 for maintenance including the replacement of various image forming members each having a particular life. Specifically, as shown in FIG. 44, lock pins or positioning and supporting means 16C and 17C extend in the direction in which the cartridge 5 is mounted and dismounted, i.e., the direction perpendicular to the sheet surface of FIG. 44. Further, as shown in FIGS. 46–48, a drive joint or drive inputting means 15C is provided for transferring a driving force to the above image forming means.

As shown in FIG. 45, the apparatus body 22 is implemented as a hexahedral box-like frame. Specifically, the apparatus body 22 has a front wall 22*a* through which the cartridge 5 is mounted and dismounted, a rear wall 22*b* facing the front wall 22*a*, a right side wall 22*c*, a left side wall 22*d*, a top wall 22*e*, and a bottom wall 22*f*. While the walls 22*a*–22*f* are shown as each having a simple configuration, they are in practice provided with notches, bent portions, holes and so forth for mounting various parts.

A wide opening is formed in the front wall 22*a* in the up-and-down direction for receiving the cartridges 4–7 in the axial direction of the drums. As shown in FIGS. 47 and 48, a rectangular window is formed in one side of the cartridge 5, so that the drum 8C is partly exposed to the outside through the window. The shaft of the drum 8C is journal led to the case of the cartridge 5. The drive joint 15C mentioned earlier is tapered and mounted on one end of the shaft of the drum 8C.

Figure 49:
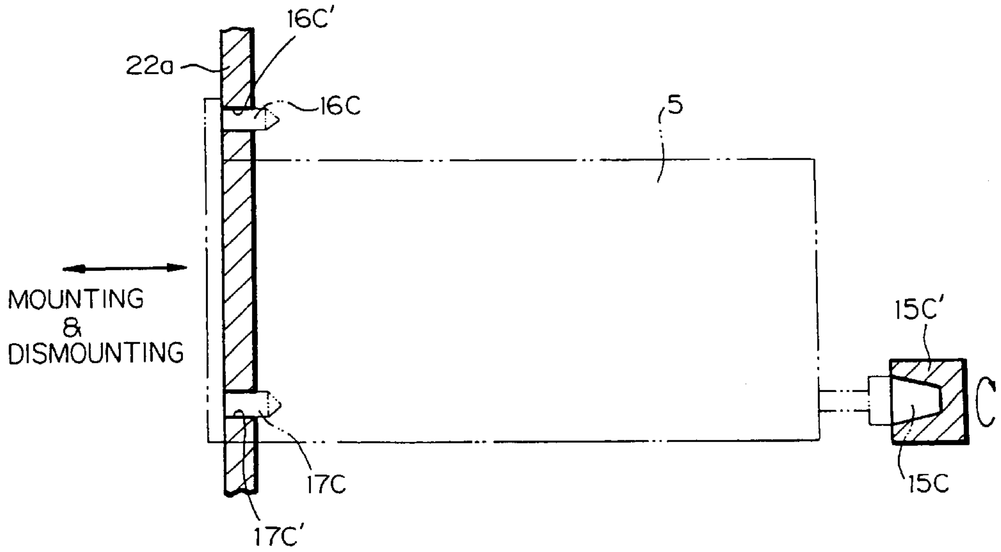
FIG. 49 shows the image forming cartridge of the conventional apparatus mounted to an apparatus body.

As shown in FIG. 49, holes 16C' and 17C' are formed in the front wall 22*a* for receiving the lock pins 16C and 17C. As shown in FIGS. 46 and 49, a prime joint 15C' is mounted on the rear wall 22*b* and mates with the drive joint 15C.

To mount the cartridge 5 to the apparatus body 22, the cartridge 5 is inserted into the apparatus body 22 in the mounting and dismounting direction in FIGS. 45, 47 and 48. At the same time as the lock pins 16C and 17C mate with the holes 16C' and 17C', respectively, the drive joint 15C mates with the tapered bore of the prime joint 15C. In this manner, the cartridge 5 is locked to the apparatus body 22 mainly at three points, i.e., by the drive joint 15C mating with the prime joint 15C' mounted on the back of the rear wall 22*b* and the lock pins 16C and 17C mating with the holes of the front wall 22*a*. The prime joint 15C' is connected to a drive source not shown. Such a configuration is also applied to the other cartridges 4, 6 and 7.

As shown in FIG. 44, a pair of registration rollers 18 are positioned in the vicinity of the lower end of the belt 1. In a full-color mode, the cartridges 4–7 respectively form toner images on their photoconductive drums in black, cyan, magenta and yellow. A paper or similar recording medium is conveyed by the registration roller 18 toward the top of the belt 1 along an inlet passage indicated by an arrow in FIG. 44. While the belt 1 conveys the paper upward, a Y, an M, a C and a K toner image are sequentially transferred from the drums of the cartridges 7–4 one above the other. The paper with the resulting full-color image is driven out of the apparatus via a fixing device not shown.

Assume that any one of the cartridges 4–7 runs out of toner or reaches a time for maintenance. Then, only the cartridge needing maintenance is pulled out of the apparatus body 22, maintained, and again mounted to the apparatus body 22, or replaced with a new cartridge.

The cartridge 5, for example, is removably supported at three points by the lock pins 16C and 17C and drive joint 15C. The charge roller 9C, developing roller 10C and so forth each are supported by the cartridge 5 at axially opposite ends thereof. To insure accuracy, the lock pins 16C and 17C and drive joints 15C supporting the cartridge 5 on the apparatus body 22 are positioned on the side walls of the cartridge 5 supporting the opposite ends of the above rollers 9C and 10*c*.

As stated above, the cartridge 5 is supported by the apparatus body 22 at its opposite ends in the lengthwise direction in a so-called bridge structure. As a result, the vibration of the apparatus body 22 ascribable to, e.g., the drive of the belt 1 and paper and the drive of the fixing device causes the cartridge 5 to vibrate.

Figure 53A:
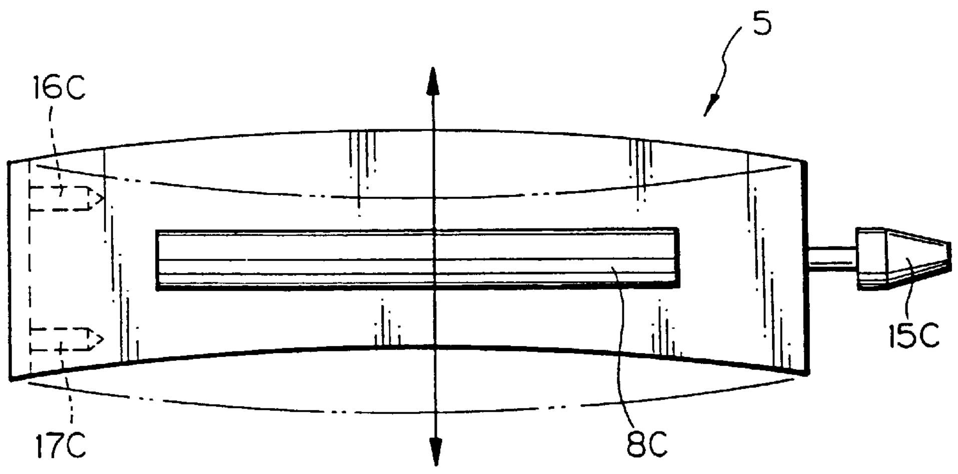
FIG. 53A is a view showing an image forming cartridge vibrating in the up-and-down direction.
Figure 53B:
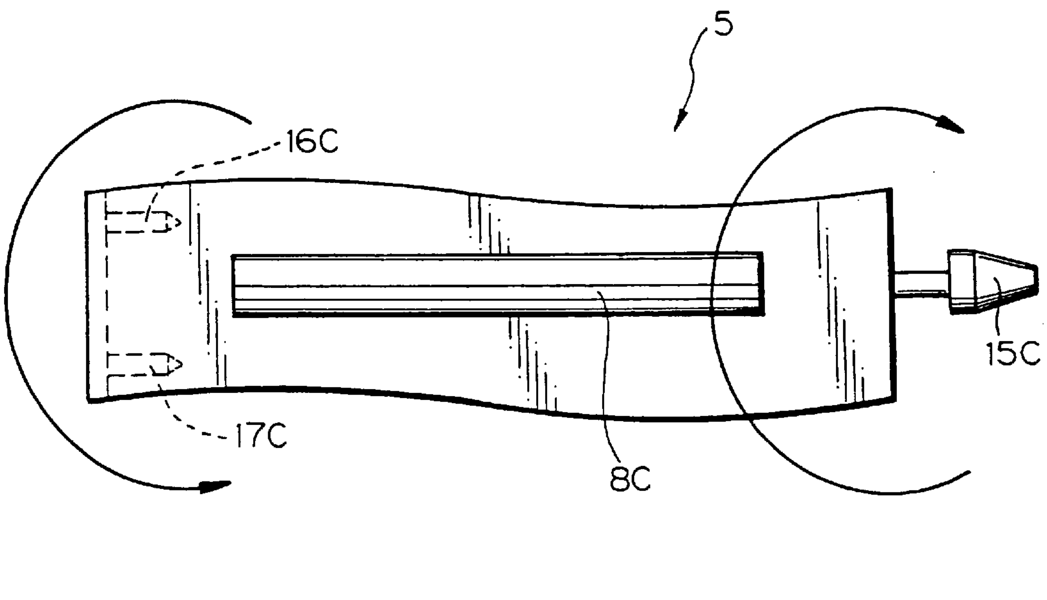
FIG. 53B is a view similar to FIG. 53A, showing the cartridge vibrating in the torsional direction.

Basically, the cartridge 5 is caused to vibrate either in the vertical direction, as indicated by an arrow in FIG. 53A, or in the torsional direction, as indicated by arrows of different directions in FIG. 53B. Let the vibration modes shown in FIGS. 53A and 538 be referred to as a vertical mode and a torsional mode, respectively. When the cartridge 5 bodily vibrates in either one of the above modes, the vibration is directly transferred to the drum 8C supported by the cartridge 5. Also, the vibration of the cartridge 5 is transferred to the drum 8C via the charge roller 9C, developing roller 10C, cleaning blade 12C and other image forming means. As a result, a displacement mainly ascribable to the drum 8C itself shifts the image writing position and an image transferring position. This makes the scanning pitch irregular in the subscanning direction (the direction of movement of the belt 1) in accordance with the resonance frequency. The irregular scanning pitch causes the density of an image to be periodically irregular in the subscanning direction (so-called banding). This is also true with the other cartridges 4, 6 and 7.

Another conventional type of image forming apparatus has photoconductive drums not mounted on the cartridges, but journal led to its body beforehand. In this type of apparatus, each cartridge includes a developing roller and a toner hopper for feeding toner to the developing roller and is mounted to the apparatus body by members similar to the lock pins and drive joint of FIGS. 46–49. For example, when the C cartridge 5 is mounted to the apparatus body 22, the developing roller 10C is brought into contact with the drum 8C mounted on the apparatus body 22 beforehand.

Figure 50:
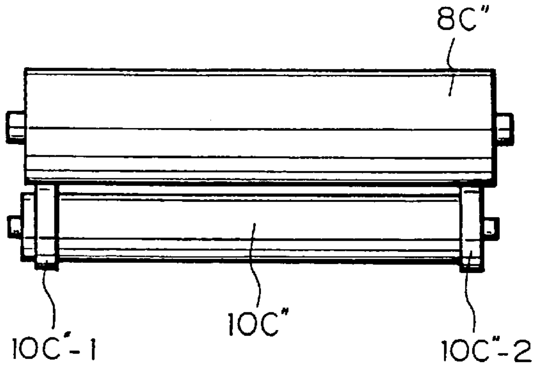
FIG. 50 is a view showing a spacing member for providing a preselected space between a developing roller and a photoconductive element
Figure 51:
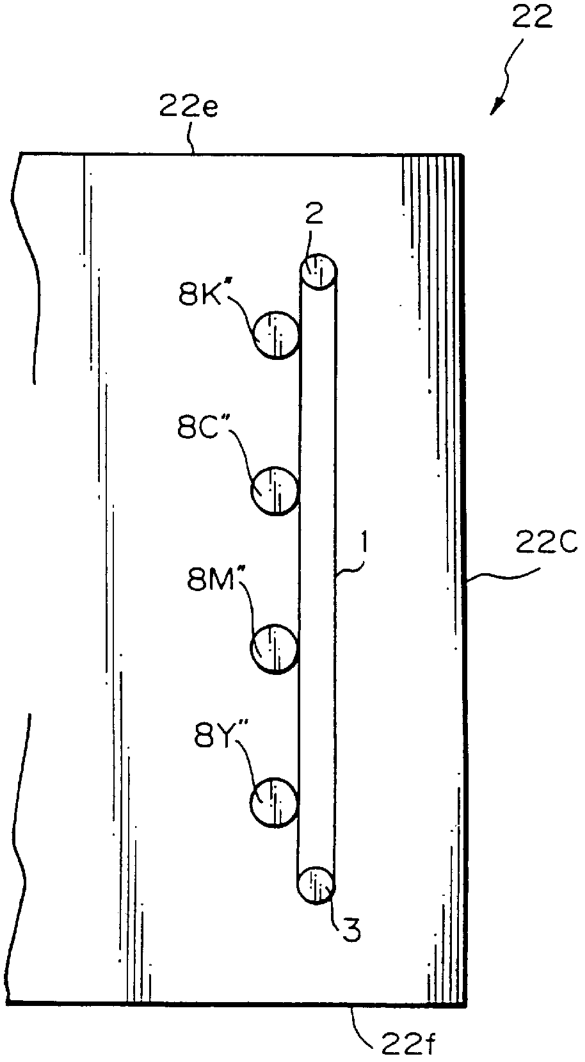
FIG. 51 is a front view showing a part of an image forming apparatus of the type having photoconductive elements mounted on its body beforehand.
Figure 52A:
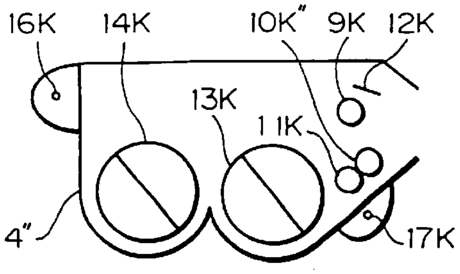
FIGS. 52A–52D are front views each showing a particular image forming cartridge not including a photoconductive element.
Figure 52B:
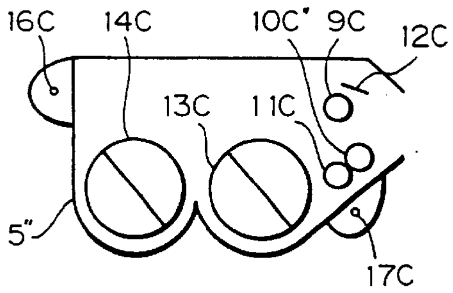

FIGS. 50, 51 and 52B show another specific configuration. As shown, when a C cartridge 5"—is mounted to the apparatus body 22, a developing roller 10C" mounted on the cartridge 5" is spaced from a photoconductive drum 8" by a small gap. As shown in FIG. 50, to maintain the above small gap, rings 10C"-1 and 10"-2 are mounted on the axially opposite ends of the developing roller 10C"; the rings 10C"-1 and 10C"-2 are greater in diameter than the developing roller 10C". The drum 8C" is mounted on the apparatus body 22 beforehand. When the cartridge 5" is mounted to the apparatus body 22, the rings 10G"-1 and 10C"-2 abut against the axially opposite ends of the drum 8C" and thereby form the above gap.

Figure 52C:
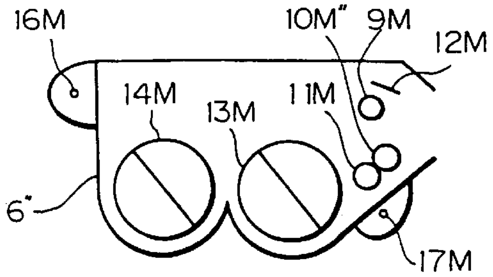
Figure 52D:
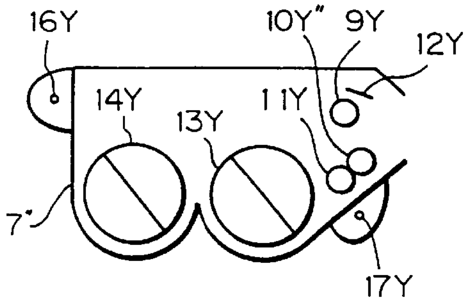

The above relation also applies to the other cartridges 4", 6" and 7". Specifically, as shown in FIG. 51, photoconductive drums 8K", 8M" and 8Y" are mounted on the apparatus body 22 beforehand. As shown in FIGS. 52A, 52C and 52D, developing rollers 10K", 10M" and 10Y" each having rings corresponding to the rings 10C"-1 and 10C"-2 are mounted on the cartridges 4", 6" and 7", respectively. When the cartridges 4", 6" and 7" are mounted to the apparatus body 22, the developing rollers 10K", 10M" and 10Y" are respectively spaced from the drums 8K", 8M" and 8Y" by the preselected small gap.

In the above apparatus, the developing roller 10C' journal led to the cartridge or the rings or spacing members 10C"-1 and 10C2-2 abut against the drum 8C" mounted on the apparatus body 22 beforehand. Consequently, when the cartridge vibrates, the drum 8C" vibrates via the developing roller or developing means 10C" or the rings 10C"-1 and 10C"-2. This results in banding in the same manner as with the cartridge 5 including the drum 8C. Specific cases in which such banding occurs are as follows.

(1) In the apparatus wherein the drum 8C is mounted on the cartridge 5, more specifically the case of the cartridge 5, when, the cartridge 5 is mounted to the apparatus body 22 for image formation, the vibration of the cartridge 5 is transferred to the drum 8C via the charge roller, developing roller 10C, cleaning blade 12C and other image forming means, resulting in banding. More specifically, the drum 8C and developing roller 10C are supported by a single member (cartridge 5) and can therefore be accurately spaced from each other without resorting to the rings 10"-1 and 10"-2, FIG. 7. However, the vibration of the cartridge 5 is transferred to the drum 8C and additionally transferred to the drum 8C via the charge roller 9C, cleaning blade 12C and other image forming means mounted on the cartridge 5.

(2) As shown in FIGS. 50–53, assume the configuration wherein when the cartridge is mounted to the apparatus body, the developing means (developing roller 10C" or the rings 10"C-1 and 10"C-2) mounted on the cartridge or one or more of the charging means and cleaning means abut against the drum 8C" mounted on the apparatus body. Even in this configuration, the vibration of the cartridge is transferred to the drum 8C" and brings about banding.

In any case, banding ascribable to the vibration of the cartridge is extremely conspicuous at and around a pitch of 0.5 mm, but it is not noticeable when the vibration frequency and therefore the pitch on an image decreases. It follows that when the resonance frequency is low in the previously mentioned modes, banding is conspicuous and often degrades an image to a critical degree. This is particularly true with an image forming apparatus including a plurality of cartridges that are driven by a sophisticated mechanism.

Conventional arrangements for supporting an image forming unit removably mounted to an apparatus body may be generally classified into the following three types:

(a) an arrangement wherein a process cartridge including four developing units arranged side by side and a photoconductive belt is removably mounted to the apparatus body; the process cartridge is supported by a resilient member affixed to a push-up member mounted on the apparatus body (Japanese Patent Laid-Open Publication No. 5-313425)

(b) an arrangement wherein a plurality of toner cartridges are removably mounted to a developing device facing an image carrier; nearby toner cartridges are formed with projections and recesses mating with each other and prevented from shaking thereby (Japanese Patent Laid-Open Publication No. 6-148968); and (c) an arrangement wherein a toner cartridge for replenishing toner is mounted to a process cartridge including a photoconductive drum and removable from the apparatus body; a guide member restricts the position of the toner cartridge being pushed into toner storing means included in the process cartridge (Japanese Patent Laid-Open Publication No. 10-20647).

Referring again to FIG. 44, four optical writing means 104K, 104C, 104M and 104Y are stacked one above the other in the direction of gravity and correspond to the four cartridges 4, 5, 6 and 7, respectively. Because the writing means 104K–104Y are identical in mechanical arrangement and therefore in members constituting them, let the following description concentrate on the writing means 104C by way of example. The other writing means 104K, 104M and 104Y are simply distinguished from the writing means 14C by suffixes Y, M and K added to the reference numerals. Also, only the operation of the writing means 104C and that of the cartridge 5 will be described because the operations of the others will be understood by analogy.

The writing means 104C scans the drum 8C with the light beam Lb in order to form a latent image on the drum 8C. Specifically, in the writing means 10C, a laser beam issuing from a laser diode, not shown, is steered by a polygonal mirror 106C and then focused on the drum 8C in the form of a beam spot via a first f-θ lens 108C, mirrors 110C and 111C, and a second f-θ lens 112C.

The cartridge 5 includes, in addition to the drum 8, the cleaning means, charging means, developing means, toner and others necessary for image formation and each having a particular life.

In the above apparatus, the cartridges 4–7 are stacked one above the other at intervals, which are too small to position the writing means 104K–104Y therebetween. This is why the writing means 104K–104Y are located at positions relatively remote from the drums 8K–8Y in the horizontal direction.

When the writing means 104C, for example, vibrates, the beam spot on the drum 8C is noticeably displaced and apt to bring about banding.

Figure 54:
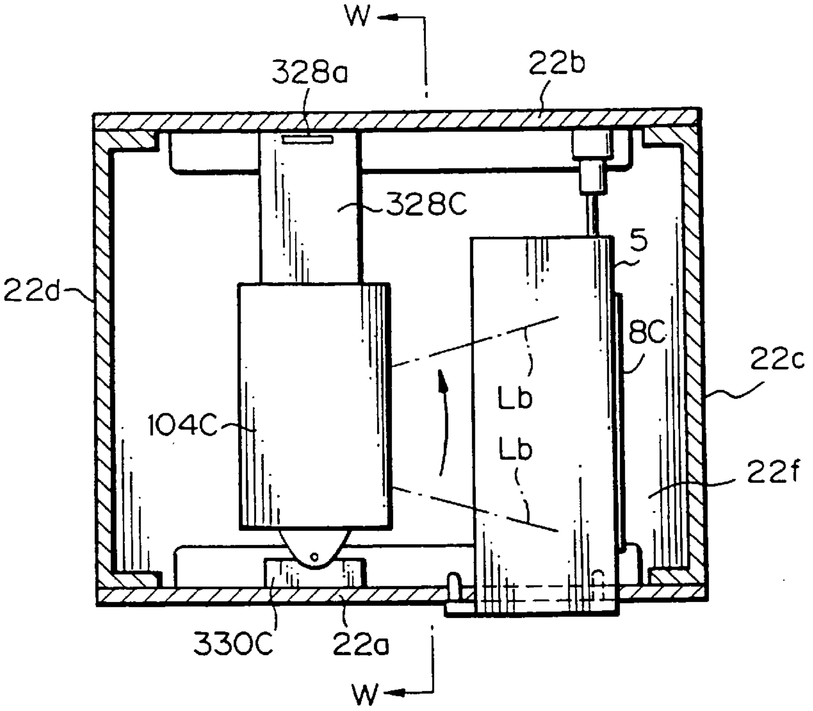
FIG. 54 is a section along line Q—Q of FIG. 45.
Figure 55:
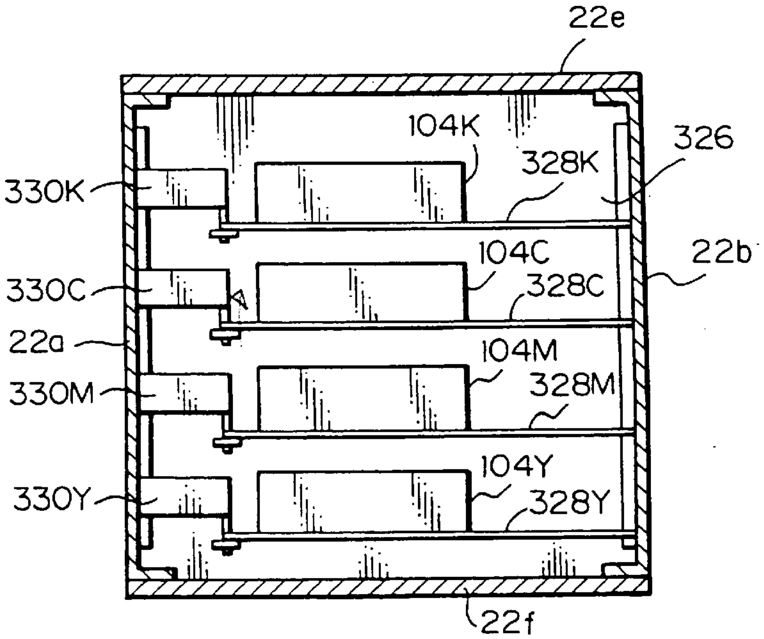
FIG. 55 is-a section along line W—W of FIG. 54.

The apparatus body 22 is basically made up of the front wall 22*a*, rear wall 22*b*, side walls 22*c* and 22*d*, top wall 22*e*, and bottom wall 22*f*, as described with reference to FIG. 45. As shown in FIGS. 54 and 55, the writing means 104C is mounted on a flat base member 328C extending between the front wall 22*a* and the rear wall 22*b*. The base member 328C is affixed to the rear wall 22*b* at the rear end and supported by the front wall 22*a* via adjusting means 330C at the front end. The base member 328C and adjusting means 330C form a bridge structure.

The adjusting means 330C is used to move the front end of the base member 328C upward or downward, i.e., in the subscanning direction in order to adjust the inclination of the light beam Lb issuing from the writing means 104C. By so adjusting all the writing means, it is possible to prevent four images of different colors from being inclined by different angles when superposed.

Specifically, as shown in FIG. 54, the base member 328C is formed with a slit-like notch 328*a* at its rear end, so that it can be moved in the above direction on a hinge basis. While adjusting means 330KI, 330C, 330M and 330Y are assigned to all of the different colors, the base member of one writing means assigned to one reference color may be directly affixed to the front wall 22*a* and rear wall 22*b* without the intermediary of the adjusting member. This allows one of such adjusting means to be omitted.

Technologies for adjusting the position of optical writing means or for preventing it from being displaced are also disclosed in Japanese Patent Laid-Open Publication Nos. 5-6071, 7-104545, and 6-34901. In Laid-Open Publication No. 5-6071, optical writing means is adjustably mounted on a structural body via a spring, a screw, etc. In Laid-Open Publication No. 7-104545, a structural body is formed of ceramics or similar material having a small coefficient of thermal expansion in order to obviate the dislocation of colors ascribable to thermal expansion. In Laid-Open Publication No. 6-34901, an elastic member is interposed between the housing of optical writing means and a cover for reducing the vibration of the cover which would effect optical writing.

Figure 56A:
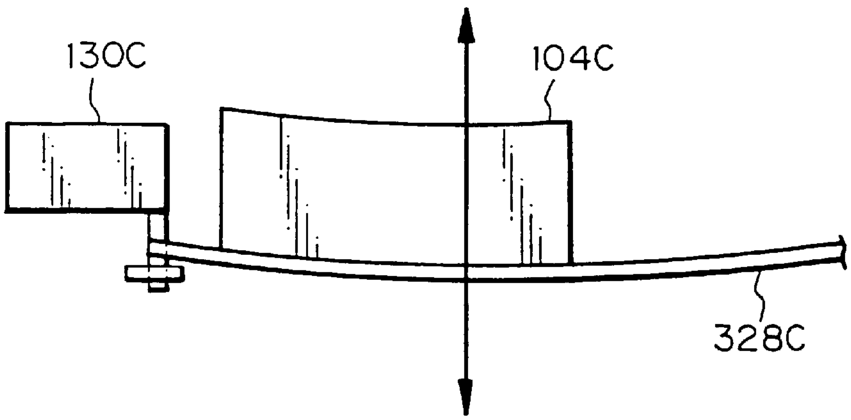
FIGS. 56A and 56B are views respectively showing a vertical vibration mode and a torsional vibration mode.
Figure 56B:
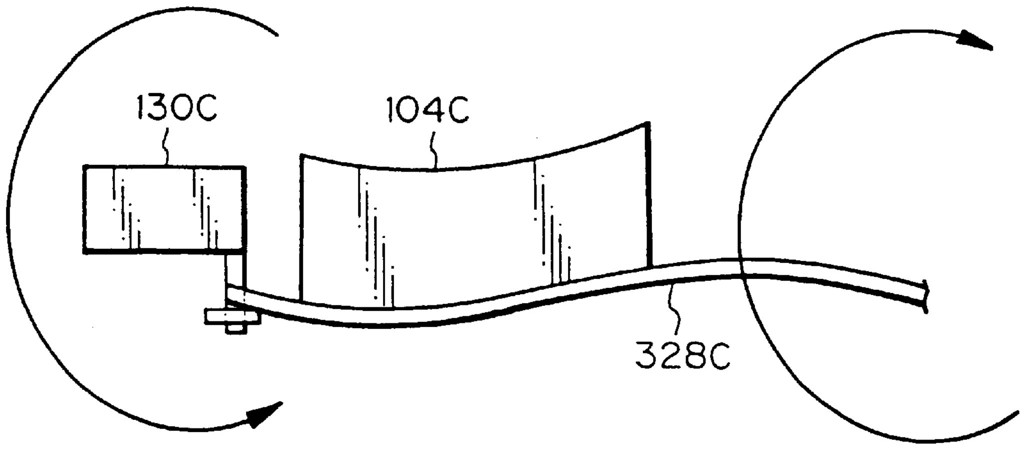

The cartridges 4–7 and optical writing means 104K–104Y arranged one above the other in the direction of gravity, as stated above, promote the miniaturization of the apparatus. However, because the base members 328K–328Y and adjusting means 330K–330Y are provided in a bridge structure, the vertical mode shown in FIG. 56A and torsional mode shown in FIG. 56B basically exist with, e.g., the writing means 104C. This is also true with the other writing means 104K, 104M and 104Y.

Assume that the vibration of, e.g., the drive source is imparted to the writing means 104C via the front wall 22*c* and rear wall 22*b*, causing the writing means 104C to bodily vibrate. Then, the beam spot on the drum 8C is periodically displaced with the result that the scanning pitch in the subscanning direction becomes irregular in accordance with the resonance frequency. The irregular scanning pitch causes the image density to become periodically irregular in the subscanning direction and thereby brings about banding, as discussed earlier.

Banding is more conspicuous with an image forming apparatus including a plurality of optical writing means than with a single-color image forming apparatus. This is because the apparatus with a plurality of optical writing means needs a sophisticated driveline apt to increase the vibration level, requires each writing means to have a small cross-sectional area for miniaturization which is apt to aggravate vibration, and makes it difficult to arrange a strong structural body around the writing means due to the limited space.

As stated above, banding ascribable to the vibration of the image forming cartridges and that of the optical writing means is the problem with the conventional technologies.

Preferred embodiments of the image forming apparatus in accordance with the present invention will be described hereinafter.

1st Embodiment

Basically, this embodiment constitutes an improvement mainly over the conventional image forming cartridge described with reference to FIGS. 44–52. Briefly, the illustrative embodiment is constructed to obviate banding ascribable to the vibration of the photoconductive elements caused by the vibration of the image forming cartridges. Therefore, the embodiment is applicable to both of the construction wherein the photoconductive elements are mounted on the cartridges, more particularly the cases of the cartridges, and the construction wherein when the cartridges supporting the photoconductive elements are mounted to the apparatus body, one or more of the charge rollers, developing means with the developing rollers or the spacing members, and cleaning blades abut against the associated photoconductive elements.

The following description will concentrate on the construction described with reference to FIGS. 44–49 and 53, i.e., the apparatus of the type including the photoconductive elements mounted on the cartridges. However, the illustrative embodiment is similarly applicable to the apparatus described with reference to FIGS. 50–52 wherein the photoconductive elements are mounted on the apparatus body.

EXAMPLE 1

Figures 1A, 1B:
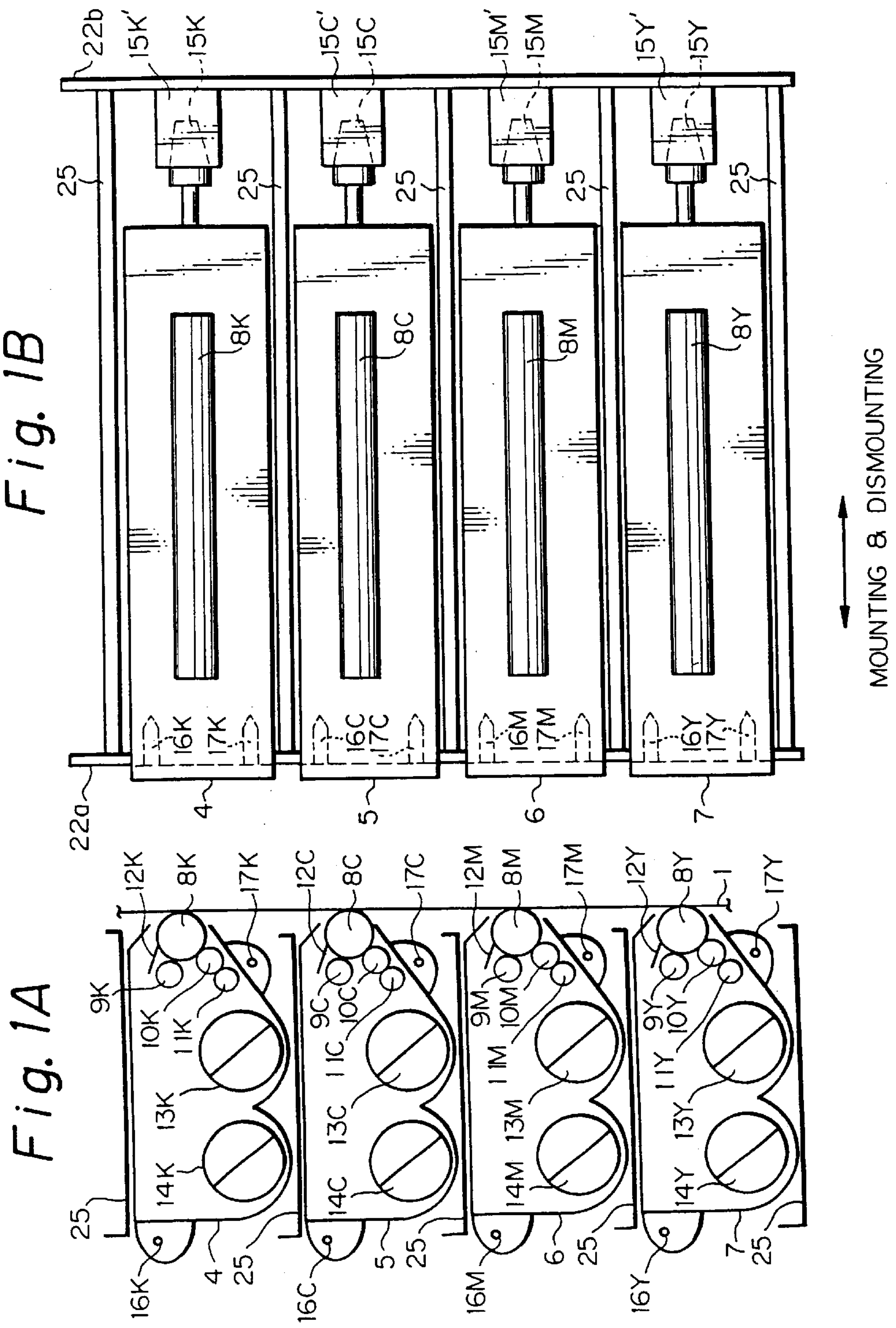
FIG. 1A is a fragmentary front view showing an image forming apparatus representative of a first example of a first embodiment.
FIG. 1B is a fragmentary side elevation of the first example.

FIGS. 1A and 1B show a first example of the first embodiment. To reduce the size of an image forming apparatus, it is preferable to stack a plurality of image forming cartridges one above the other in the direction of gravity at a small distance or pitch. In this example, structural members (horizontal stays hereinafter) 25 each are interposed between nearby ones of a plurality of cartridges 4–7 arranged at a-small pitch. Horizontal stays 25 similar to the above stays 25 are also positioned above the top cartridge 4 and below the bottom cartridge 7, respectively.

The horizontal stays 25 each are implemented as a plate bent upward at its opposite ends in the direction perpendicular to the cartridge mounting and dismounting direction. The stays 25 are affixed to the front wall 22*a* in the vicinity of the cartridge mounting and dismounting opening and the rear wall 22*b* by fastening means not shown.

The cartridges 4–7 each are supported by the upper surface of the associated stay 25. Because the stays 25 are fastened to the front wall 22*a* in the vicinity of the opening and the rear wall 22*b*, as stated above, the two walls 22 and 22*b* are connected together by the stays 25 in the vicinity of the cartridges 4–7.

As for the cartridge 5, the vibration of the lock pins 16C and 17C and drive joint 15C can be effectively reduced because they rest on the front wall 22*a* and rear wall 22*b*. This is also true with the other cartridges 4, 6 and 7. Particularly, as for a vibration mode in which the front wall 22*a* and rear wall 22*b* perform planar vibration, the stays 25 are configured to just halve the plane. This successfully obviates a low frequency resonance mode undesirable from the banding standpoint and thereby allows only a high frequency resonance mode to occur. In addition, the stays 25 positioned above the top cartridge 4 and below the bottom cartridge 7 increase the rigidity of the entire cartridge support structure and thereby further promote the obviation of banding.

The stays 25 may be formed with holes and notches for implementing cooling passages and for an assembly purpose so long as they do not reduce strength. At the opening for mounting and dismounting the cartridges, the edges of the stay 25 are exposed to the outside and should preferably be bent or folded for safety and greater strength.

The cartridges 4–7 have substantially the same sectional shape and extend in the axial direction of, e.g., the photoconductive drums 8K–8Y. Therefore, so long as the cartridges 4–7 are mounted and dismounted in the axial direction of the drums 8K–8Y, as in this example, the stays 25 may be formed with projections and recesses complementary to the sectional shape of the cartridges 4–7. Such projections and recesses increase the strength of the structural body and save space without interfering with the cartridges 4–7 at the time of mounting or dismounting.

Further, the cartridges 4–7 each storing a developer of particular color are identical in mechanical arrangement and can therefore be produced with identical specifications. This promotes the efficient production of the cartridges 4–7 on a quantity basis.

Preferably, the members needing accurate positioning relative to the apparatus body 22, e.g., the drums 8Y–8K have their shafts supported by bearings with play (margin) relative to the associated cartridges in the direction perpendicular to the shafts. Then, the cartridges each are positioned on a preselected part of the associated stay 25. In this configuration, when each cartridge is affixed to the apparatus body 22, the shaft of the drum mounted on the cartridge with the above play moves within the range of the play. As a result, the drive joint 15C, FIG. 49, mates with the prime joint 15C' mounted on the apparatus body 22, setting up a drive transmission path.

As stated above, each photoconductive drum is supported by the associated cartridge in, so to speak, a floating manner.

Therefore, when the cartridge is positioned relative to the apparatus body 22 via the associated stay 25, the drive joint mounted on the shaft of the drum is brought into engagement with the prime joint. As a result, the drum is accurately positioned on the apparatus body 22. Further, the cartridge does not need a support structure for accurately positioning the drum relative to the cartridge. In addition, the cartridge supported by the stay 25 vibrates little. That is, both of the accurate positioning of the drum relative to the apparatus body 20 and the reduction of vibration of the cartridge are achievable at the same time. Because a plurality of stays 25 are arranged one above the other in association with the cartridges, there can be effectively suppressed vibration in the vertical direction and therefore banding.

EXAMPLE 2

Figure 2B:
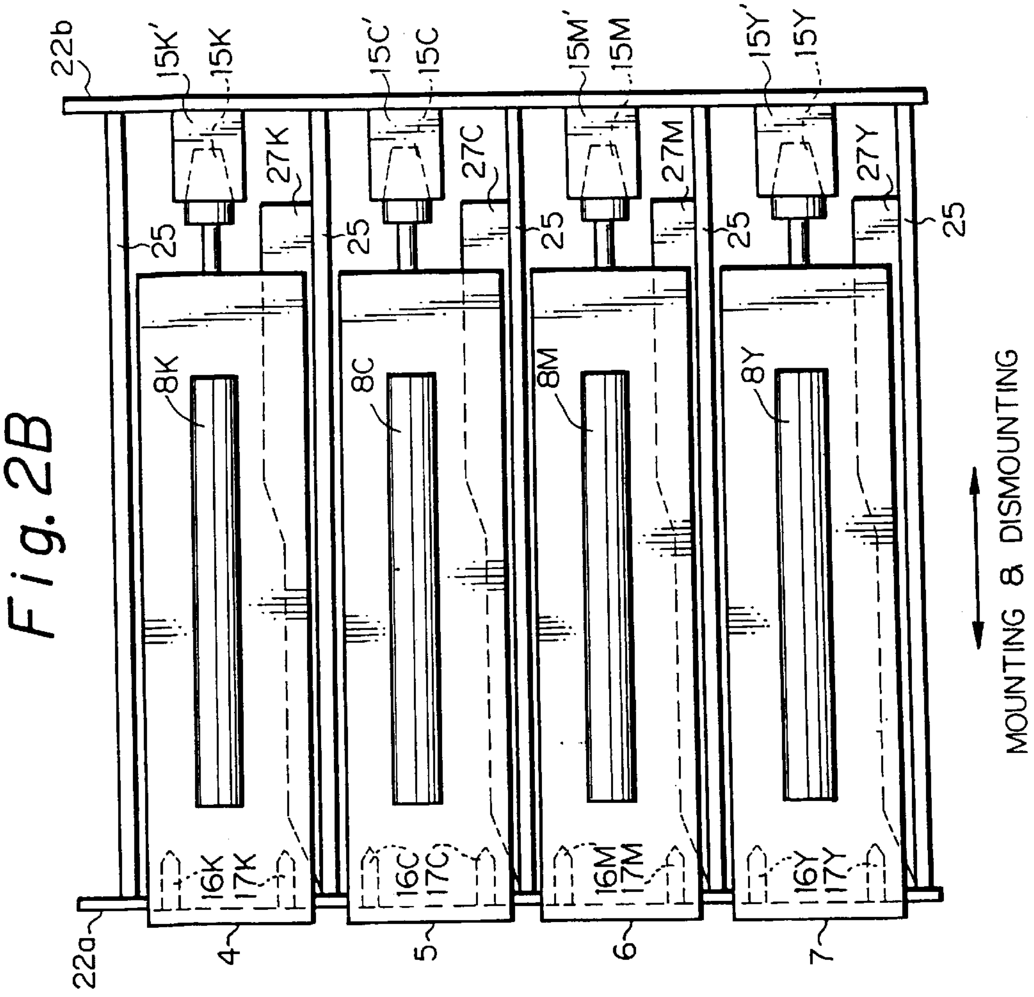
FIG. 2B is a fragmentary side elevation of the second example.
Figure 2A:
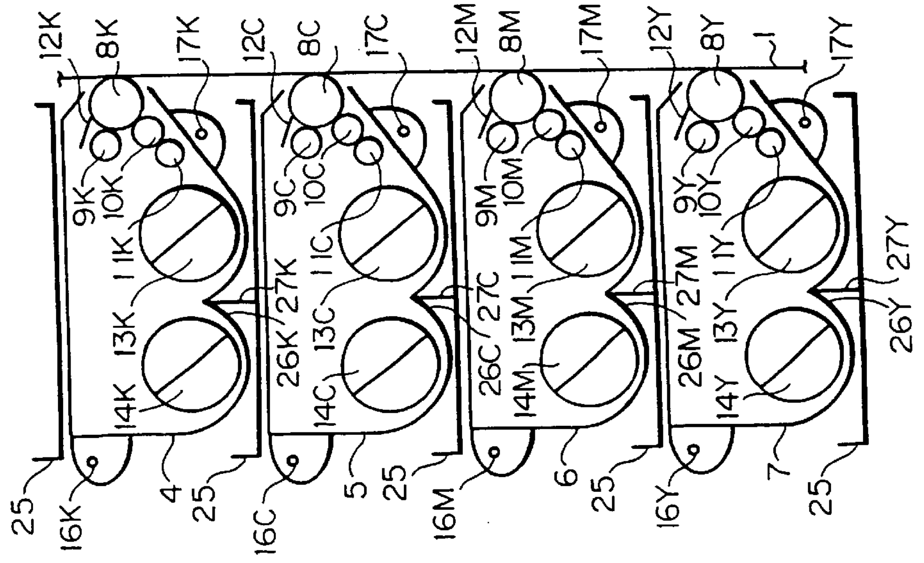
FIG. 2A is a fragmentary front view showing an image forming apparatus representative of a second example of the first embodiment.

FIGS. 2A and 2B show a second example of the first embodiment. As shown, the bottom of, e.g., the cartridge 5 is curved in the form of a letter W complementarily to the curvatures of nearby rotary bodies 13C and 14C. The boundary between the two downwardly convex curved portions is implemented as-a recess 26C extending in the mounting and dismounting direction of the cartridge 5.

In this example, a guide 27C implemented as a flat plate stands upright from the upper surface of each horizontal stay 25 of Example 1 and is received in the recess or portion to be guided 26C of the cartridge 5 above the stay 25. In this condition, the guide 27C guides the cartridge 5. The other cartridges are also provided with such guides 27C. The stay 25 above the top cartridge 4 is not provided with the guide 27C because it has nothing to guide.

The guide 27C received in and extending along the recess 26C of the cartridge positioned above the guide 27C prevents the cartridge being mounted to or dismounted from the apparatus body 2 from being displaced in the direction perpendicular to the mounting or dismounting direction or from being rotated to hit against the surrounding members.

As shown in FIG. 2B, the guide 27C, as well as guides 27K, 27M and 27Y, is increased in height halfway. This configuration is successful to reduce the clearance between the guide and the portion to be guided at the last stage of mounting and therefore to guide the cartridge with accuracy.

The guides 27K–27Y may be respectively molded integrally with the stays 25 or may be produced independently of the stays 25 and then affixed to the stays 25. Moreover, the upright guides 27K–27Y increase the bending rigidity of the stays 25 in the up-and-down direction and thereby increase mechanical strength and obviates banding.

EXAMPLE 3

Figure 3B:
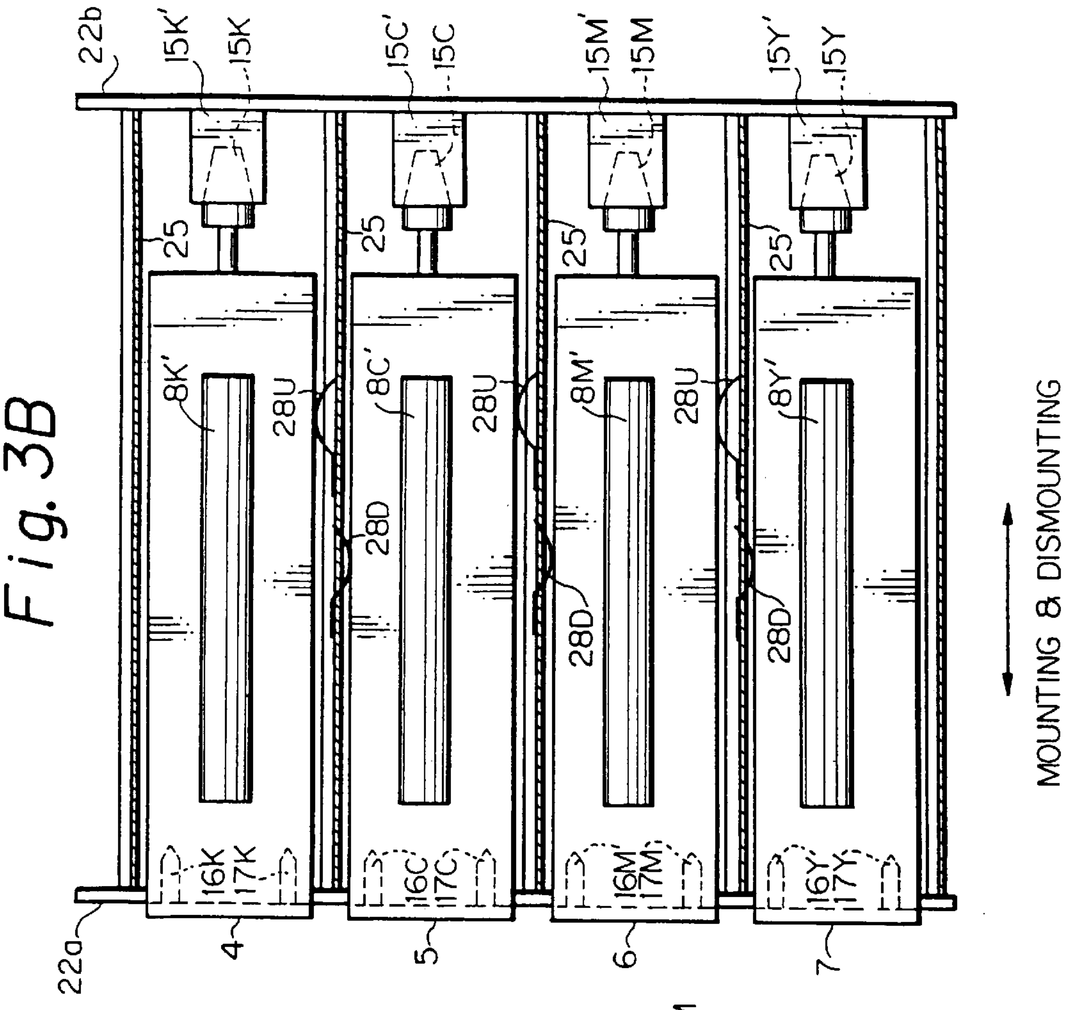
FIG. 3B is a fragmentary side elevation of the third example.
Figure 3A:
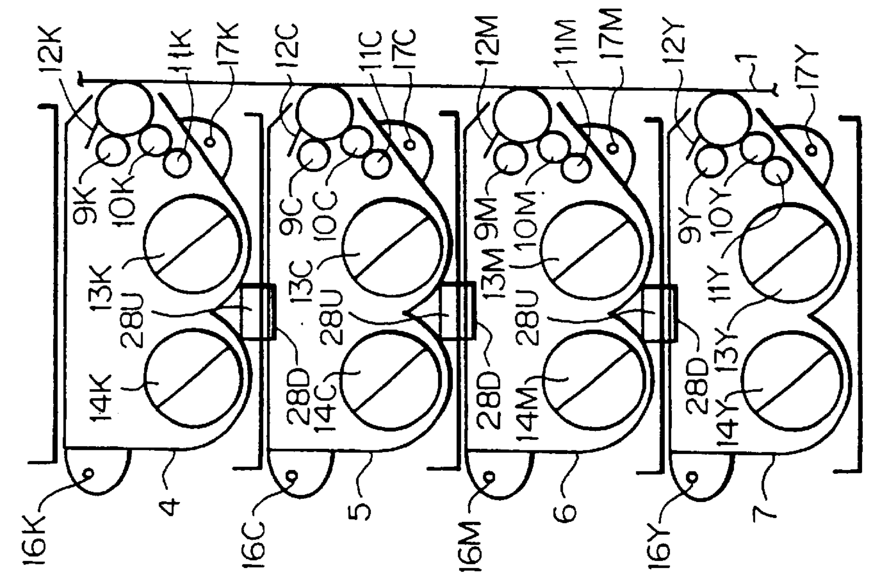
FIG. 3A is a fragmentary front view showing an image forming apparatus representative of a third example of the first embodiment.

FIGS. 3A and 3B show a third example of the illustrative embodiment. As shown, among the stays included in Example 1, the stay 25 between the cartridges 4 and 5, the stay 25 between the cartridges 5 and 6 and the stay 25 between the cartridges 6 and 7 each are provided with resilient pressing means for pressing the overlying and underlying cartridges.

Figure 6:
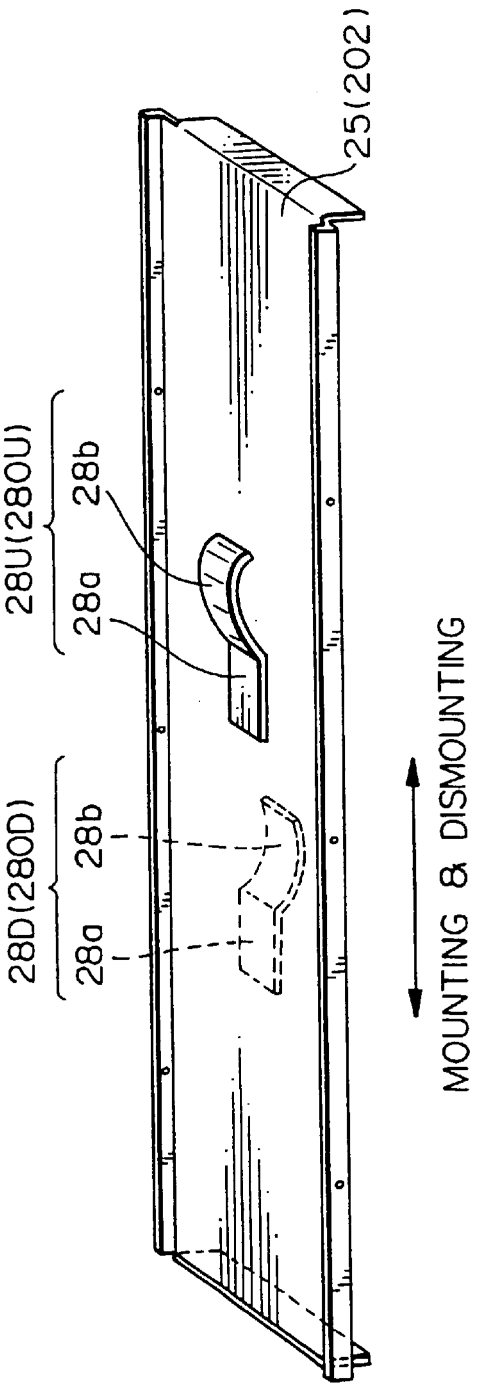
FIG. 6 is a perspective view of a horizontal stay.

Specifically, as shown in FIGS. 3A, 3B and 6, the pressing means is implemented by leaf springs 28U and 28D each having a flat portion 28*a* and a curved portion 28*b*. The leaf spring 28U has its flat portion 28*a* affixed to the upper surface of the stay 25 with the curved portion 28*b* being convex upward. The leaf spring 28D has its flat portion 28*a* affixed to the lower surface of the stay 25 with the curved portion 28*b* being convex downward.

The leaf springs 28U and 28D are respectively affixed to the intermediate portion of the upper surface and the intermediate portion of the lower surface of the stay 25. The leaf spring 28U resiliently presses the cartridge 4 over lying the stay 25 upward while the leaf spring 28D resiliently presses the cartridge 5 underlying the stay 25 downward. Paying attention to the leaf springs 28U and 28D on the stay 25 intervening between the cartridges 4 and 5, the curved portion 28*b* of the spring 28U presses the cartridge 4 upward while the curved portion 28*b* of the spring 28D presses the cartridge 5 downward. This is also true with the leaf springs 28U and 28D affixed to the stay 25 between the cartridges 5 and 6 and the stay 25 between the cartridges 6 and 7. The leaf springs 28U and 28D resiliently support the antinode portions of the cartridges 4–7 as to the amplitude of vibration and thereby effectively suppress vibration.

Assume that the guides 27K–27Y shown in FIGS. 2A and 2B are applied to this example. Then, the leaf springs 28U are so positioned as to respectively contact the two convex portions of the bottom of the overlying cartridge, so that the springs 28U do not interfere with the above guide. This configuration will be described specifically later with reference to FIG. 4A.

The leaf springs 28U and 28D pressing the bottom of the overlying cartridge and the top of the underlying cartridge, respectively, may be positioned face-to-face and provided with the same resilient force. This arrangement is advantageous in that the resilient forces of the leaf springs 28U and 28D cancel each other and do not bend the entire cartridges. Such leaf springs or similar biasing parts may also be provided above the top cartridge and below the bottom cartridge for the same purpose.

Each cartridge may be formed with recesses such that the leaf springs 28U and 28D click into the recesses when the cartridge is inserted into the apparatus body 22 as far as a preselected position. The clicking action of the leaf springs 28Y and 28D will allow the operator to surely feel the insertion of the cartridge.

Further, the above recesses for the clicking action may be configured to more firmly mate with the leaf springs 28U and 28D. This allows the cartridges to be fixed in place without resorting to lock levers or similar extra affixing means and thereby reduces the cost of the apparatus. This example may be combined with the guides of Example 2 in order to promote easy mounting and dismounting of the cartridges. The leaf springs 28U and 28D may be replaced with any other suitable resilient members, if desired.

EXAMPLE 4

Figure 4B:
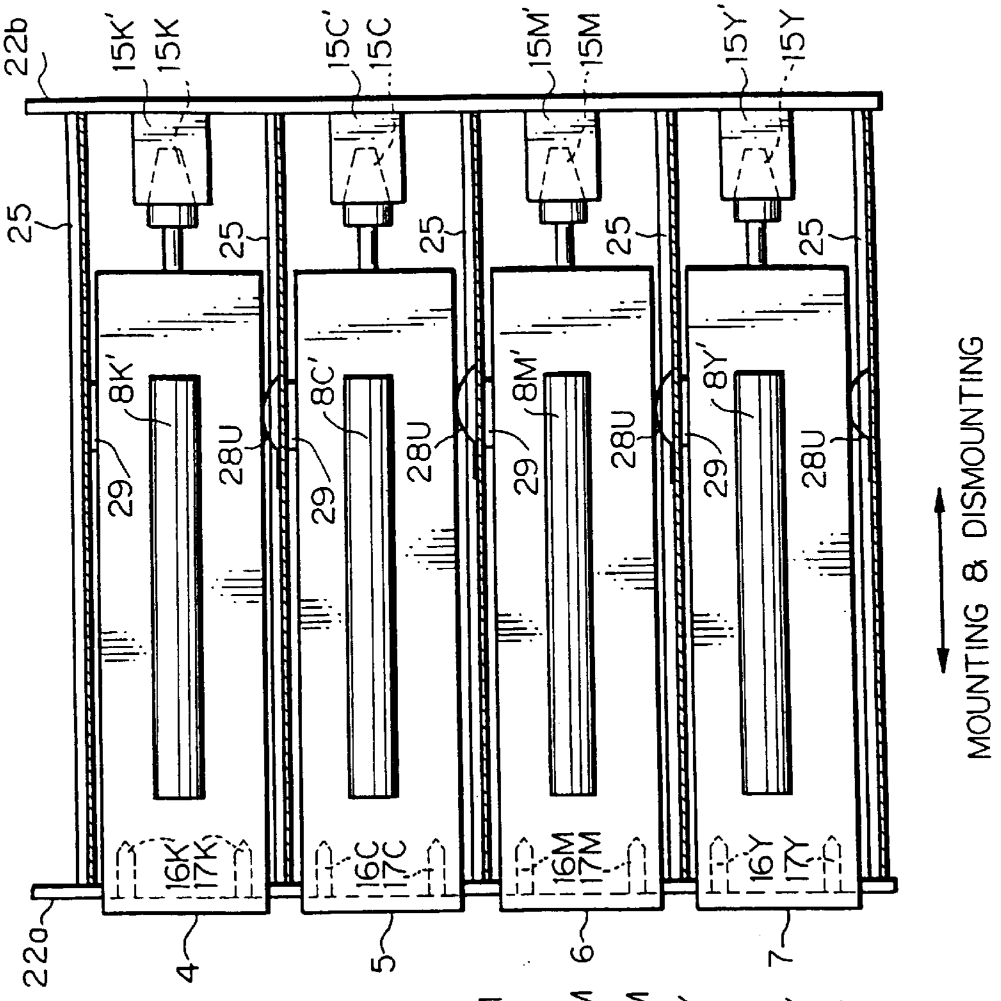
FIG. 4B is a fragmentary side elevation of the fourth example.
Figure 4A:
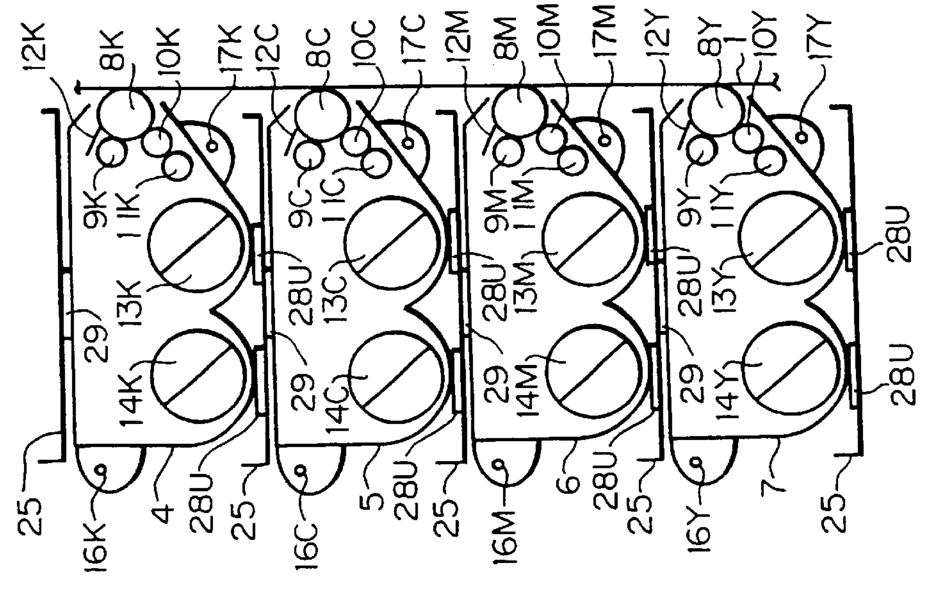
FIG. 4A is a fragmentary front view showing an image forming apparatus representative of a fourth example of the first embodiment.
Figure 7:
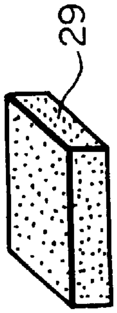
FIG. 7 is a perspective view of a vibration-proof rubber block.

FIGS. 4A and 4B show a fourth example of the illustrative embodiment. As shown, a vibration-proof rubber block 29 is fitted on the lower surface of the stay 25 overlying the cartridge 4. The rubber block 29 contacts the upper surface of the cartridge 4 and exerts a viscoelastic pressing force between the stay 25 and the cartridge 4. Such rubber blocks 29 are also fitted on the lower surfaces of the stays 25 overlying the other cartridges 5, 6 and 7, respectively. As shown in FIG. 7, each rubber block 29 has a rectangular configuration.

Two leaf springs 28U each having the configuration shown in FIG. 6 are affixed to the upper surface of the stay 25 between the cartridges 4 and 5 at positions around a position facing the rubber block 29. The leaf springs 28U are also affixed to the upper surface of the stay 25 between the cartridges 5 and 6 and the upper surface of the stay 25 between the cartridges 6 and 7 in exactly the same manner as the above leaf springs 28U.

As shown in FIG. 4A, at the position facing the rubber block 29, the bottom of the casing of the cartridge is recessed. The two leaf springs 28Y are respectively positioned to face the two convex portions of the casing on both sides of the above recess. The leaf springs 28U and rubber block 29 constitute vibration proofing means.

The leaf springs 28U bias the overlying cartridge upward. The cartridge is therefore pressed against the overlying rubber block 29 with the result that the rubber block 29 exerts a viscoelastic force on the cartridge. The rubber block 29 enhances vibration proofing based on the thermal conversion of vibration energy making the most of the viscoelastic characteristic.

In this example, even leaf springs exerting a relatively small resilient force can implement the above vibration proofing, so that the force to at on each cartridge is reduced. That is, this example causes a minimum of deformation to occur despite the use of the leaf springs and is therefore desirable from the accuracy standpoint as well.

With the combination of the leaf springs and rubber blocks, it is possible to effectively generate the force for pressing each cartridge against the overlaying rubber block. Further, by additionally using the guide arrangement of Example 2 and so configuring the guide as to increase the frictional force of the rubber block 29 just before the completion of the insertion of the cartridge, it is possible to reduce the manual force required to slide the cartridge on the rubber block 29 to an adequate degree.

EXAMPLE 5

Figures 5A, 5B:
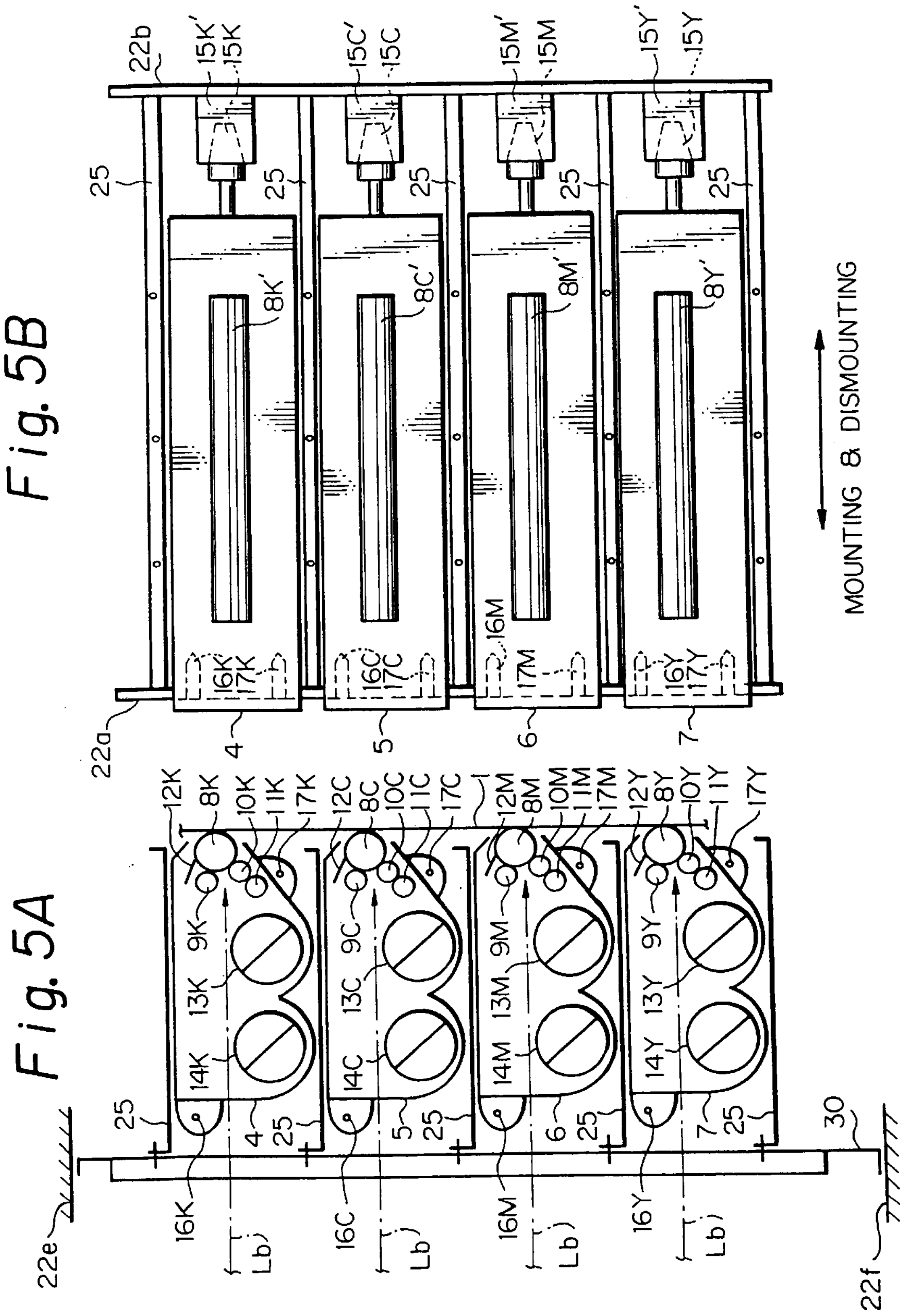
FIG. 5A is a fragmentary front view showing an image forming apparatus representative of a fifth example of the first embodiment.
FIG. 5B is a fragmentary side elevation view of the fifth example.
Figure 8:
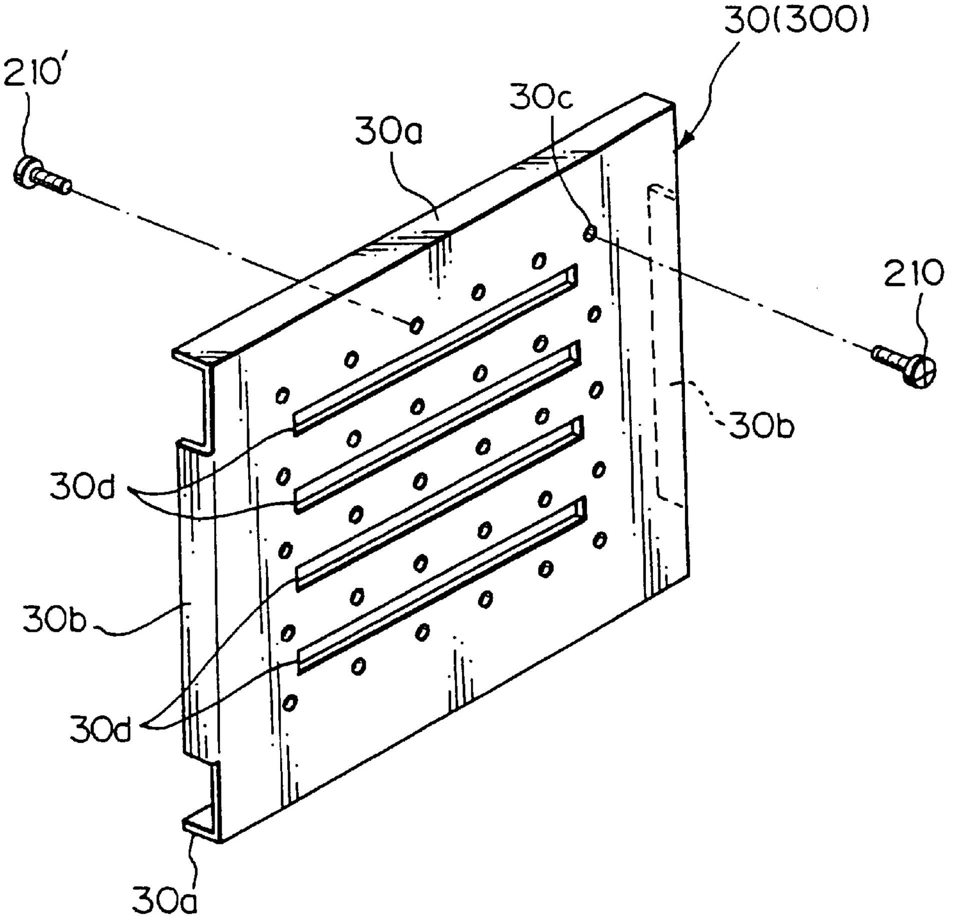
FIG. 8 is a perspective view of a vertical stay.

FIGS. 5A and 5B show a fifth example of the illustrative embodiment. As shown in FIGS. 5A and 8, a flat vertical stay 30 is mounted on the left ends of the stays 25 and faces the left side wall 22*d* (FIG. 45). As shown in FIG. 8, the vertical stay 30 includes mounting portions 30*b* positioned to face the scanning direction of the light beams Lb. The mounting portions 30*b* are affixed to the front wall 22*a* and rear wall 22*b*, respectively. The stay 30 is affixed to the top wall 22*e* at its upper end and affixed to the bottom wall 22*f* at its lower end. The vertical flat portion of the stay 30 is fastened to the horizontal stays 25 by screws 210.

In the above configuration, the horizontal stays 25 are firmly affixed to the apparatus body via the vertical stay 30 and reduce the planar vibration mode of the front wall 22*a* and rear wall 22*b* more positively. In addition, the stays 25 and stay 30 substantially perpendicular to each other realize an extremely great sectional moment and thereby provides the structural body with great bending rigidity.

Particularly, the improved bending rigidity is successful to reduce the vibration of the horizontal stays 25 themselves in the event of suppression of vibration, as described in relation to Examples 3 and 4. This example may therefore be combined with the configurations of Examples 3 and 4.

Optical writing devices, not shown, are located at the left-hand side of the cartridges 4–7 shown in FIG. 5A and respectively emit the light beams Lb toward the drums 8K–8Y. The writing devices may also be supported by a structural body similar to the structural body including the vertical stay 30. In such a case, the stay 30 bears a compression stress (buckling load) ascribable to the weights of the cartridges and those of the writing devices in the vertical direction. This condition increases strength, reduces deformation and suppresses resonance more positively than a condition wherein the cartridges and writing devices are arranged on horizontal plates. This will be described more specifically in conjunction with Example 1 of 3rd Embodiment.

As shown in FIG. 8, the vertical stay 30 is formed with slots 30*d* each extending in the scanning direction of the light beam Lb with a width corresponding to the diameter of the light beam Lb. The light beams Lb issuing from the writing devices are respectively passed through the slots 30*d*. That is, each slot 30*d* has a minimum necessary length and a minimum necessary width for allowing the light beam Lb to pass therethrough. This minimizes a decrease in the rigidity of the stay 30 as a structural body and serves to obviate banding.

The vertical stay 30 may be additionally formed with holes and notches so long as they do not reduce the strength of the stay 30. For example, as shown in FIG. 8, holes 30*c* positioned above and below each slot 30*d* are used to affix the horizontal stays 20 to the vertical stay 30. It should be noted that any suitable number of holes 30*c* may be formed in the stay 30. While the stays 20 are fastened to the stay 30 by the screws 210, the screws 210 will be replaced with, e.g., soldering when use is made of metal or replaced with, e.g., injection molding when use is made of resin.

Examples 1–5 shown and described may be suitably combined not only to obviate banding but also to promote easy operation and reduce the cost.

2nd Embodiment

This embodiment mainly constitutes an improvement over the construction of the conventional optical writing means described with reference to FIGS. 54 and 55. The structural parts of this embodiment identical with the structural parts of the conventional arrangement are designated by like reference numerals and will not be described specifically in order to avoid redundancy.

EXAMPLE 1

Figure 9:
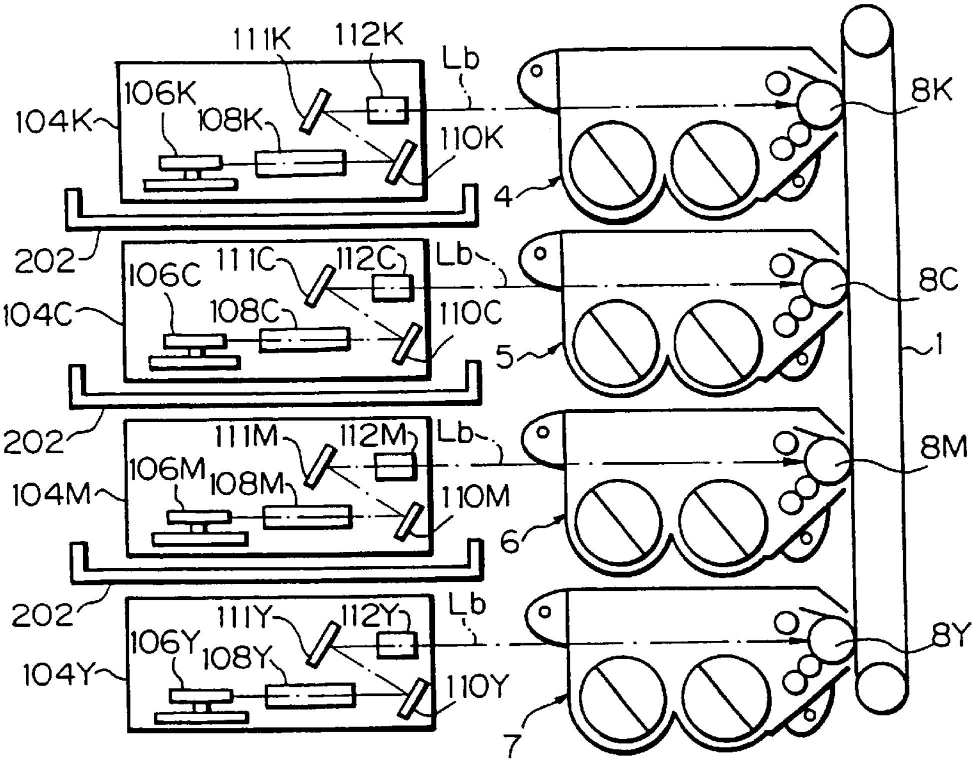
FIG. 9 is a fragmentary front view showing a first example of a second embodiment of the present invention.
Figure 10:
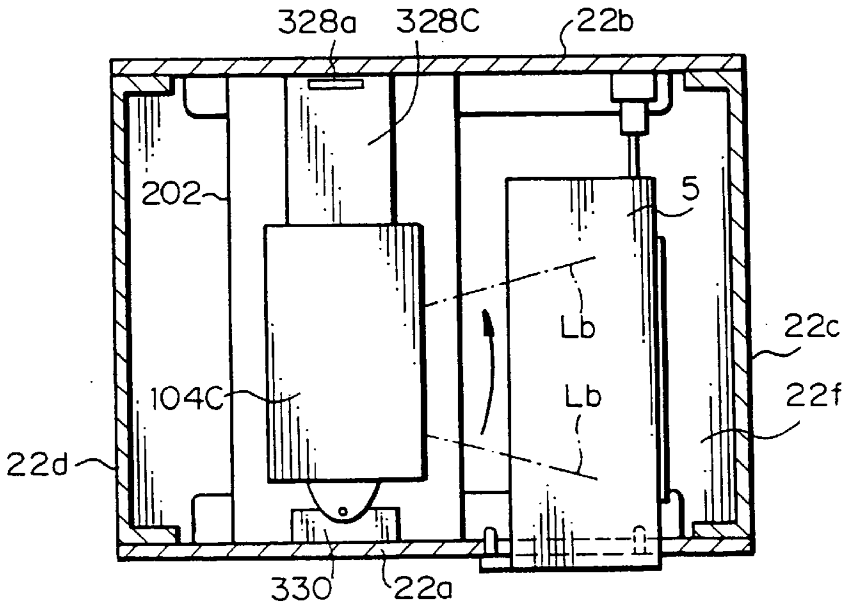
FIG. 10 is a plan view of the first example shown in FIG. 9.
Figure 11:
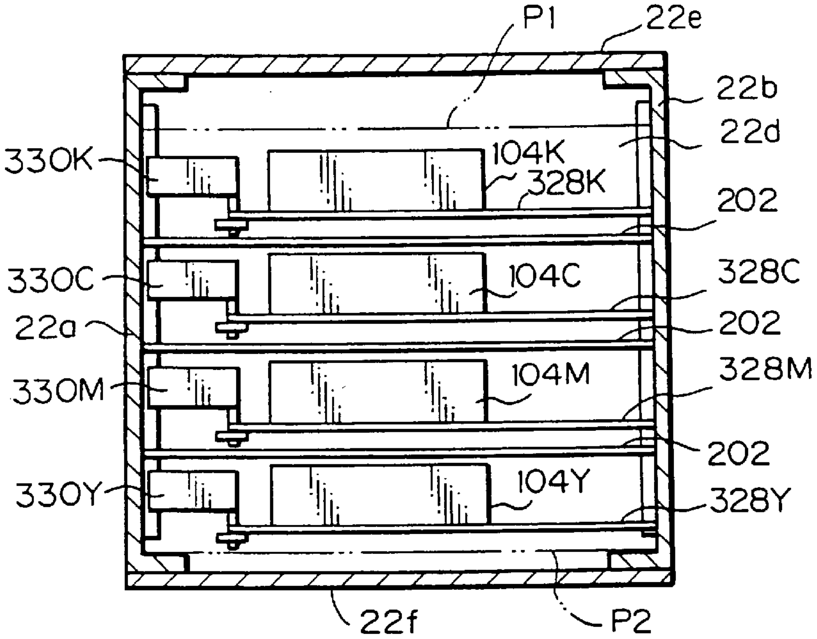
FIG. 11 is a side elevation of the first example shown in FIG. 9.

As shown in FIGS. 9–11, this example is implemented as a full-color image forming apparatus including four image forming cartridges 4–7 stacked one above the other in the direction of gravity. Four optical writing means 104K–104Y are also arranged one above the other in the direction of gravity and associated with the cartridges 4–7, respectively. The writing means 104K–104Y respectively include the adjusting means 330K–330Y stated earlier.

As shown in FIG. 11, a flat structural member 202 is positioned between nearby ones of the writing means 104K–104Y, i.e., between the base member 328K and the writing means 104C underlying the base member 328K. The structural member 202 partitions off the space between the nearby writing means. The structural member 202 is affixed to the front wall 22*a* and rear wall 22*b* by fastening means, not shown, at opposite ends thereof.

Structural members 202 are also provided between the writing means 104C and 104M and between the writing means 104M and 104Y in exactly the same manner as the above structural member 202. In FIG. 9, the base members 328K–328Y included in the writing means 104K–104Y are not shown.

The structural members 202 between the consecutive writing means 104K–104Y increase the structural strength of the front wall 22*a* and rear wall 22*b*, among others. This is successful to suppress the vibration of the portions around the positions where the writing means 104K–104Y are affixed to the walls 22*a* and 22*b*. Particularly, as for the planar vibration mode of the walls 22 and 22*b*, the structural members 202 divide the plane of vibration and eliminates a low frequency resonance mode apt to result in banding.

As shown in FIG. 11, the structural members 202 represented by dash-and-dot lines P1 and P2 may also be positioned above the top writing means 104K and below the bottom writing means 104Y. Such structural members 202 further increase the total strength of the apparatus body and enhance the anti-banding function.

The structural members 202 may be formed with holes and notches for cooling and mounting purposes so long as they do not reduce the strength implementing the above anti-banding function. Further, the structural members 202 may be suitably bent or folded. The cartridges 4–7 and writing means 104K–104Y should preferably be arranged at a small pitch in order to further miniaturize the apparatus.

EXAMPLE 2

Figure 12:
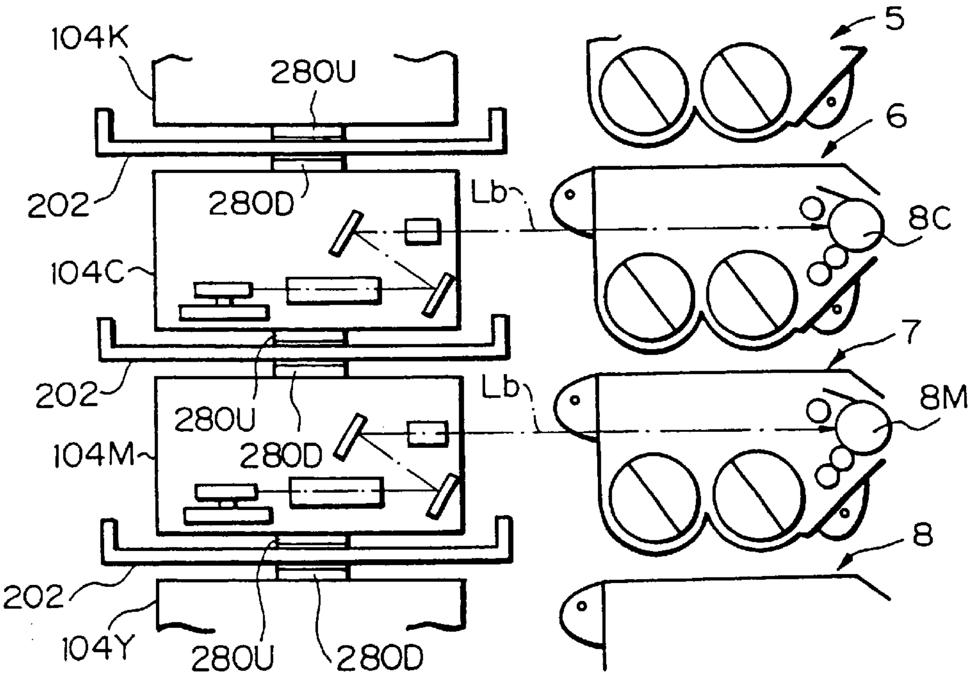
FIG. 12 is a fragmentary plan view showing a second example of the second embodiment.
Figure 13:
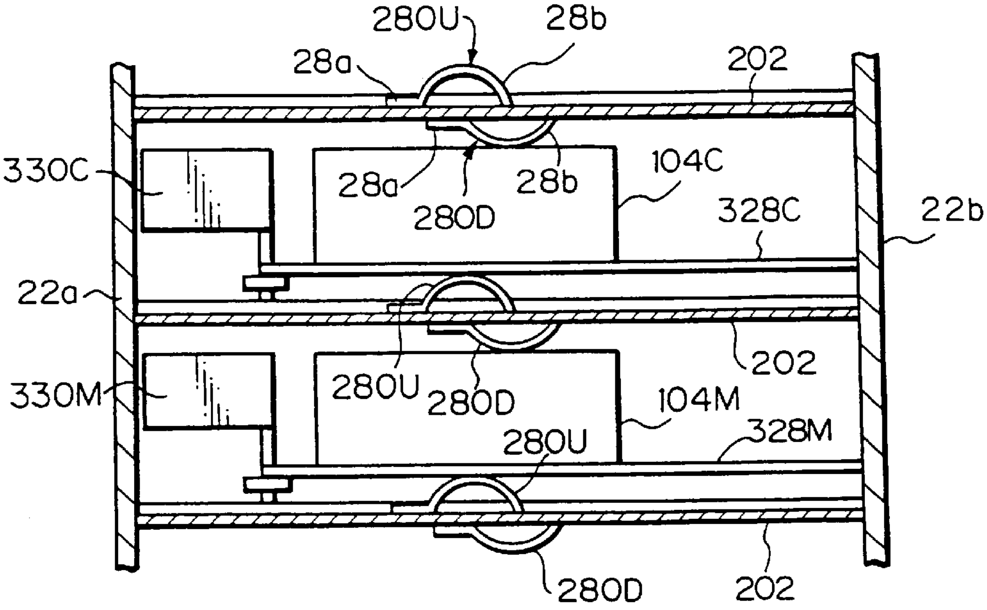
FIG. 13 is a side elevation of the second example shown in FIG. 12.

As shown in FIGS. 6, 12 and 13, a leaf spring or pressing means 280D is mounted on the lower surface of, e.g. the structural member 202 between the writing means 104C and 104M for pressing the writing means 104M downward. Likewise, a leaf spring or pressing means 280U is mounted on the upper surface of the structural member 202 for pressing the writing means 104C upward. This configuration is also applied to the other structural members 202.

The leaf springs 280U and 280D are identical in shape and material with the leaf springs 28U and 28D described with reference to FIG. 6. The leaf springs 280U and 280D are affixed to the intermediate portion of the upper surface and the intermediate portion of the lower surface of the structural body 202. In FIG. 13, the curved portion **28*b* of the leaf spring 280U and the curved portion 28*b* of the leaf spring 280D are shown as having different curvatures. This stems from a difference in the distance to the base member of the structural body 202 or distance to the optical writing means. In FIG. 12, the base members 328K–328Y are not shown. In this manner, the leaf springs 280U and 280D each resiliently press associated one of the writing means 104K–104Y** upward or downward.

The writing means 104C, for example, is expected to be displaced by the adjusting means 330 together with the base member 328C (movable member) and cannot therefore be directly affixed to the structural member 202. This is also true with the other writing means 104K, 104M and 104Y. The leaf springs or pressing means 280U and 280D allow the structural members 202 to support the writing means 104C while maintaining the writing means 104C movable. Assume the vibration mode of FIG. 56A having nodes at opposite ends of the writing means 104C and an antinode at the intermediate portion of the writing means 104C. Then, the leaf springs 280U and 280D exert forces in such a manner as to suppress the antinode of the amplitude of the above vibration mode. This further enhances the anti-vibration function available with the structural members 202. This is also true with the other writing means 104K, 104M and 104Y.

The leaf springs 280U and 280D may advantageously exert the same pressing force, so that the resilient forces acting on the top and bottom of each writing means can cancel each other. This prevents the writing means from being bent.

In this example, the leaf springs 280U and 280D are also positioned on the upper surface of the top structural members 202 and the lower surface of the bottom structural members 202, respectively. Although these leaf springs 280U and 280D do not actually exhibit their pressing function, they are significant for the following reasons. The structural members 202 all having the leaf springs 280U and 280D promote standardization, i.e., general-purpose application and can readily cope with an increase in the number of writing means. Further, the top and bottom structural members 202 increase the mechanical strength of the entire structural body. The leaf springs 280U and 280D are a specific form of pressing means and may be replaced with any other suitable resilient means.

EXAMPLE 3

Figure 14:
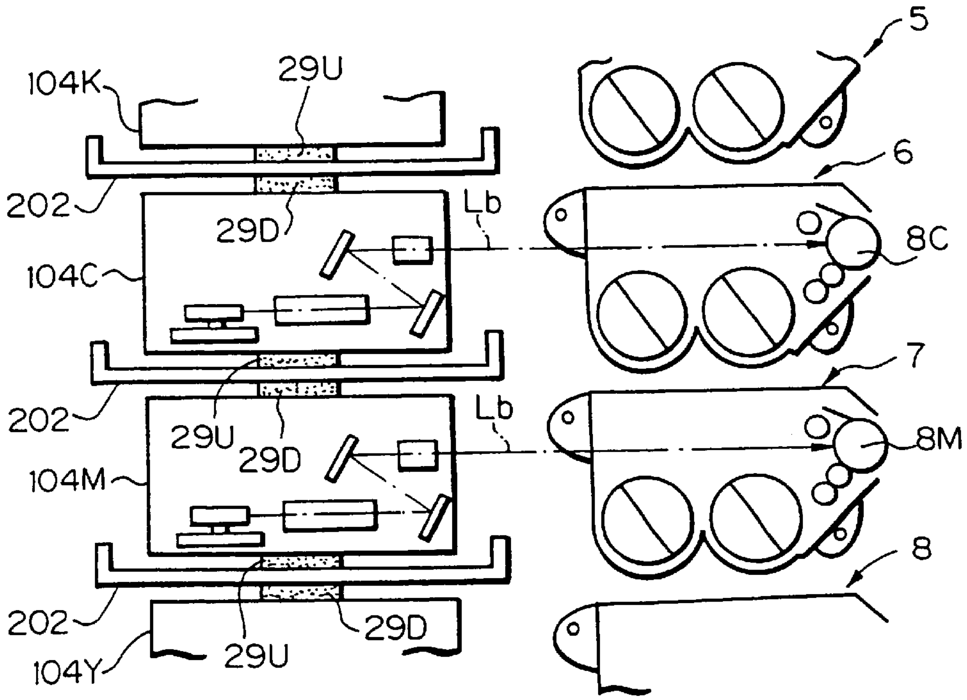
FIG. 14 is a fragmentary view showing a third example of the second embodiment.
Figure 15:
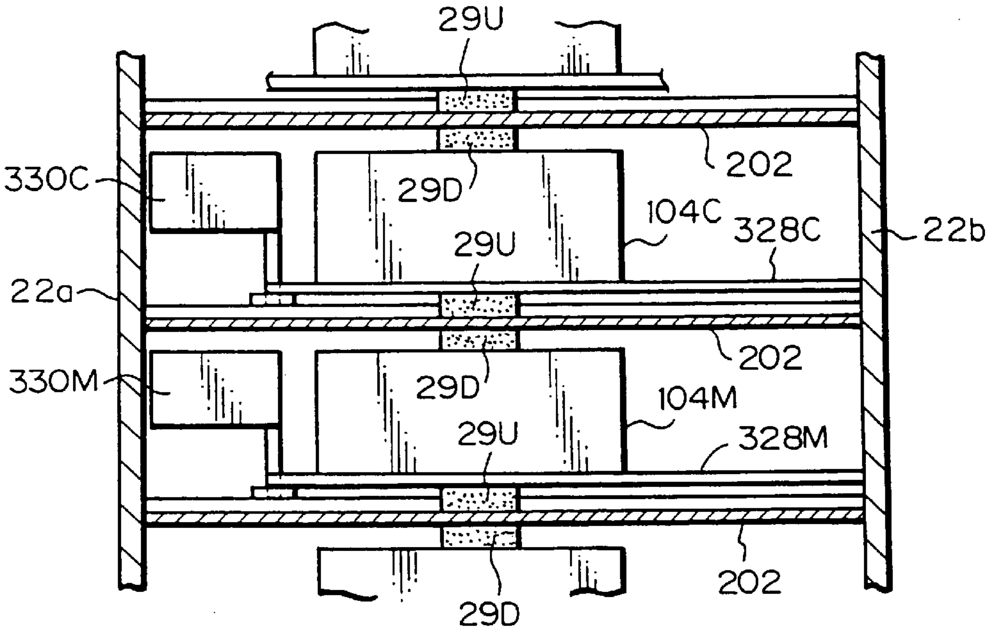
FIG. 15 is a side elevation of the third example shown in FIG. 14.

FIGS. 7, 14 and 15 show a third example of the illustrative embodiment. As shown, a vibration-proof rubber block 29D is fitted on the lower surface of the structural member 202 between the writing means 104C and 104M. Likewise, a vibration-proof rubber block 29U is fitted on the upper surface of the above structural member 202. This is also true with the other structural members.

The rubber blocks or vibration proofing means 29U and 29D are identical in shape and material with the rubber blocks 29 of FIG. 7 having a viscoelastic characteristic. The rubber blocks 29U and 29D each having a suitable size are respectively adhered to the intermediate portion of the upper surface and the intermediate portion of the lower surface of the structural member 202. In FIG. 14, the base members 328K–328Y are not shown. The vibration proofing means implemented by the rubber blocks 29U and 29D proof vibration based on the thermal conversion of vibration energy and thereby effectively suppress the previously stated vibration mode.

The rubber blocks or vibration proofing means 29U and 29D are capable exhibiting their effect based on viscosity even when their elasticity is low, compared to the leaf springs or resilient pressing means 280U and 280D. Therefore, the forces to act on the writing means 104K–104Y and therefore the deformation of the writing means 104K–104Y can be reduced, insuring the accuracy of the structural body.

The rubber blocks-29U and 29D are also fitted on the upper surface of the top structural member 202 and the lower surface of the bottom structural member 202, respectively, for the reasons described with reference to FIGS. 6, 12 and 13.

The rubber blocks 29U and 29D may abut against the base members 328K–328Y or the writing means 104K–104Y via leaf springs or similar resilient members, if desired. In this case, the adjusting means 130K–130Y can function without resorting to the great deformation of the rubber blocks 29U and 29D.

EXAMPLE 4

Figure 16:
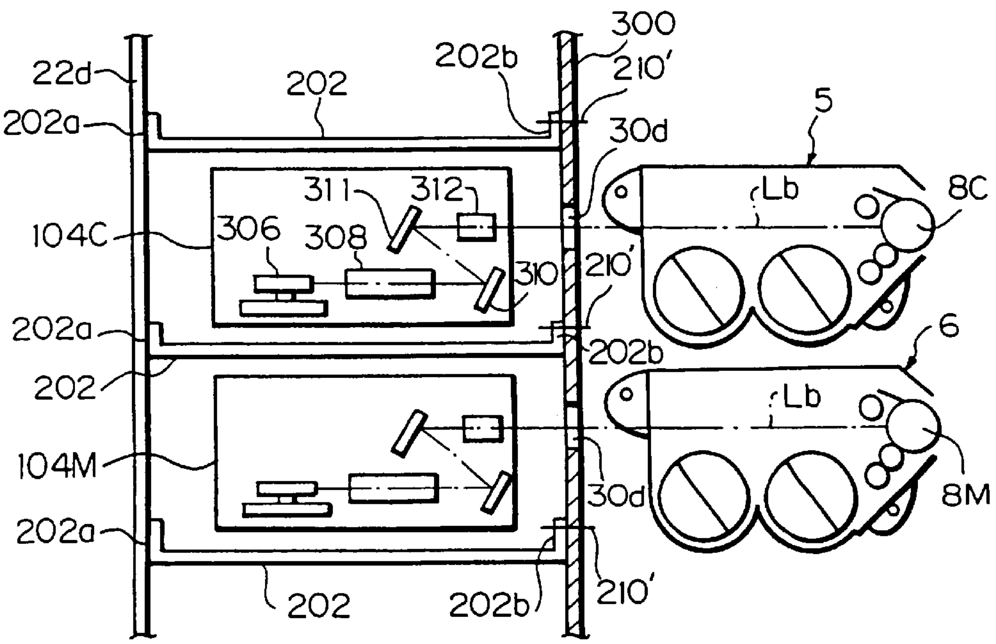
FIG. 16 is a fragmentary view showing a first example of a third embodiment of the present invention.
Figure 17:
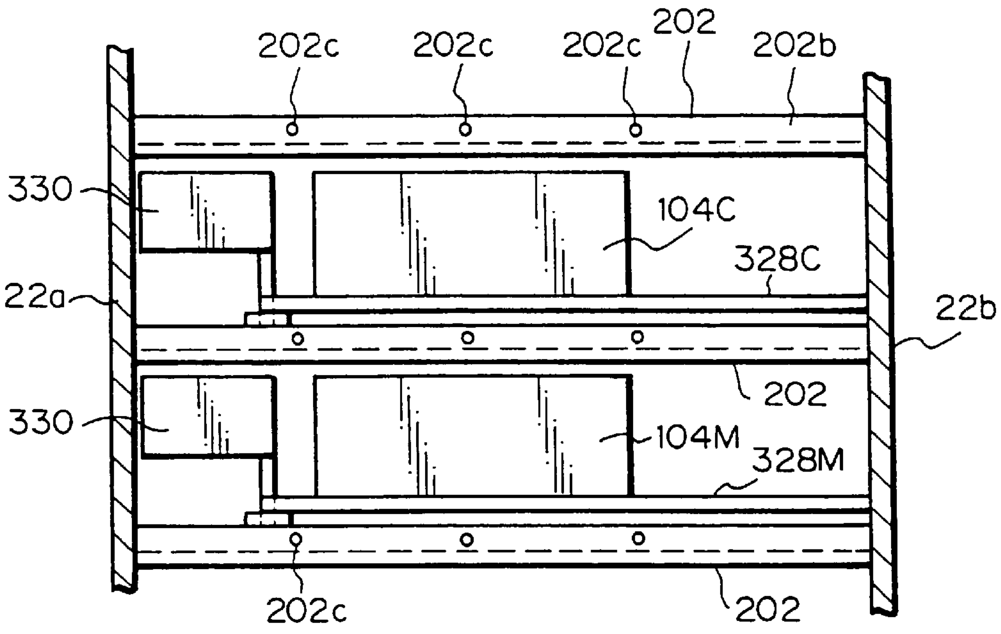
FIGS. 17 and 18 are fragmentary side elevation of the first example shown in FIG. 16.

FIGS. 8, 16 and 17 show a fourth example of the illustrative embodiment. As shown in FIG. 16, each structural member 202 has vertical walls **202*a* and 202*b* at its right and left edges. The left vertical wall 202*a* is affixed to the left side wall 22*b* by fastening means. The right vertical wall 202*b* is directly affixed to a vertical stray or structural member 300 extending in parallel to the direction of arrangement of a plurality of optical writing means and substantially perpendicularly to each structural member 202**.

The vertical stay 300 may be provided with the same shape and same size as the vertical stay 30 shown in FIG. 8. The various portions of the stay 300 are designated by the same reference numerals as the portions of the stay 30. Specifically, the stay 300 includes the portions **30*a* to be affixed to the top wall 22*e* and bottom wall 22*f*, portions 30*b* to be affixed to the front wall 22*a* and rear wall 22*b*, and holes 30*c* for affixing the stay 30 to the structural members 202. In addition, four slots 30*d* are formed in the stay 300 in order to allow the light beams Lb issuing from the writing means 104K–104Y** to pass therethrough.

As shown in FIG. 17, the right wall **202*b* of each structural member 202 is formed with screw holes 202*c* corresponding in position to the holes 30*c* of the stay 300. Each structural member 202 and stay 300 are fastened together by screws or fastening means 210' shown in FIG. 8**.

The stay 300 further promotes the suppression of the planar vibration mode achievable with the front wall **22*a* and rear wall 22*b*. Further, the horizontal structural members 202 and stay 300** substantially perpendicular to each other implement an extremely great sectional moment and provide the structural body with great bending rigidity.

In this example, the writing means 104K–10Y are arranged one above the other in the direction of gravity. The stay 300 therefore bears a compression force ascribable to its own weight and the weights of the structural members 202 in the direction perpendicular to the direction of thickness. Such an arrangement therefore increases strength, reduces deformation and obviates the resonance mode, compared to an arrangement wherein writing means are arranged in the horizontal direction.

The stay 300 formed with the slots 30*d* may be additionally formed with holes and notches for cooling and mounting purposes so long as they do not reduce strength. While the structural members 202 and stay 300 are shown as being connected together by the screws 210, they may be, e.g., welded together when use is made of metal or may be implemented by a single molding by injection molding.

3rd Embodiment

This embodiment obviates banding by using all or part of the configurations of the examples of the foregoing embodiments.

EXAMPLE 1

In Example 5 of 1st Embodiment shown in FIGS. 5A, 5B and 8, the horizontal stays 25 are connected to the vertical stay 30. In Example 4 of 2nd Embodiment shown in FIGS. 8 and 17, the structural members 202 are connected to the vertical stay 300. The vertical stays 30 and 300 have been shown and described as being separate members having the same shape and same size.

Figure 18:
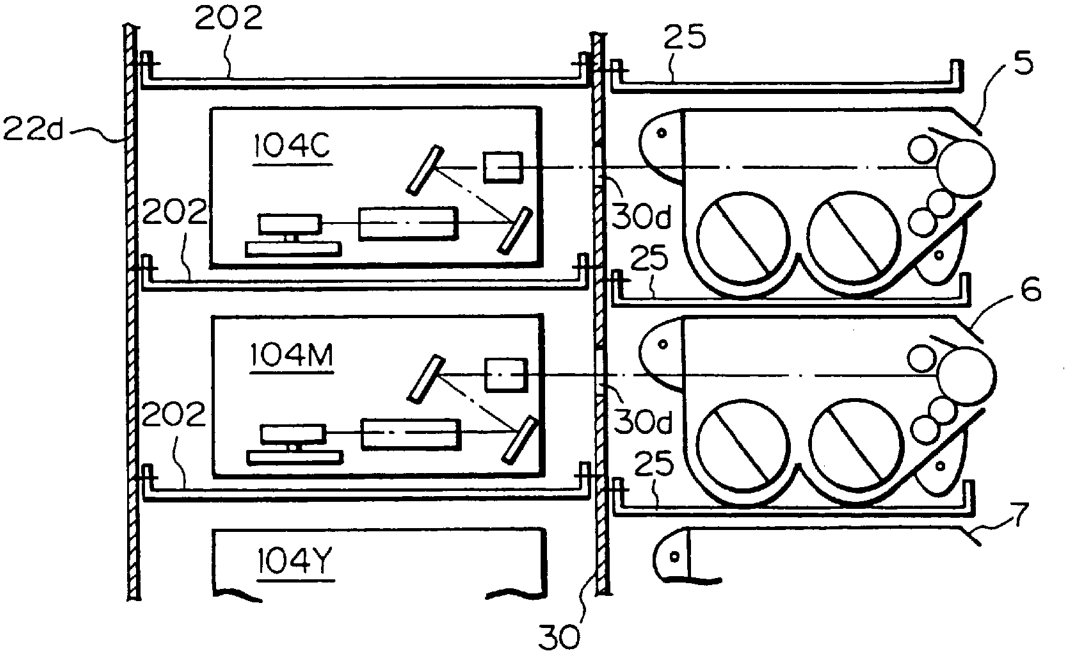
Figure 19:
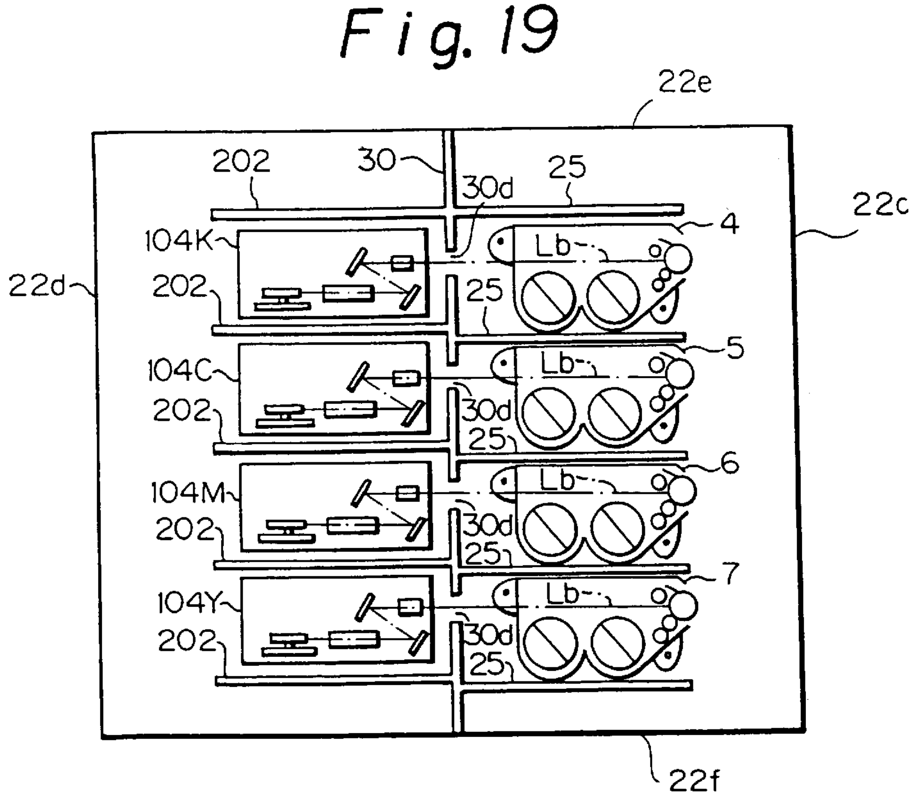
FIG. 19 is a fragmentary front view showing a modification of the first example shown in FIG. 16.

In this example, the vertical stays 30 and 300 shown in FIGS. 5A and 5B and FIG. 16, respectively, are implemented as a single member. Specifically, as shown in FIGS. 18 and 19, this example includes a single vertical stay 30 to which both the horizontal stays 25 and structural members 202 are connected. In this sense, the vertical stay 30 plays the role of a shared structural member.

In the above configuration, the horizontal stays 25, vertical stay 30, structural members 202 and apparatus body 22 are constructed into a single structural body. This increases the rigidity of the entire structure and thereby obviates banding. In addition, the stay 30 serves to reinforce the structural members 202 and horizontal stays 25 and thereby enhances simplification and miniaturization.

In FIG. 19, the left ends of the structural members 202 are spaced from the left side wall 22*d* for the layout reason. That is, the space is used to accommodate electrical parts and other parts for image formation. Even this configuration is capable of obviating banding because the structural members 202 are affixed to the front wall 22*a* and rear wall 22*b* at their front and rear ends. As shown in FIG. 18, the left ends of the structural members 202 may be affixed to the left side wall 22*d*, depending on the layout. In FIG. 19, the horizontal stays 25, vertical stay 30 and structural members 202 are indicated by bold lines to show that they constitute a single structural body.

EXAMPLE 2

In FIG. 1, the cartridges 4–7 are separated from each other by the structural members or partitions 25. In the example to be described, the image forming means is received in a casing separate from the image forming cartridge. The casing plays the role of the structural member separating nearby cartridges.

Figure 20:
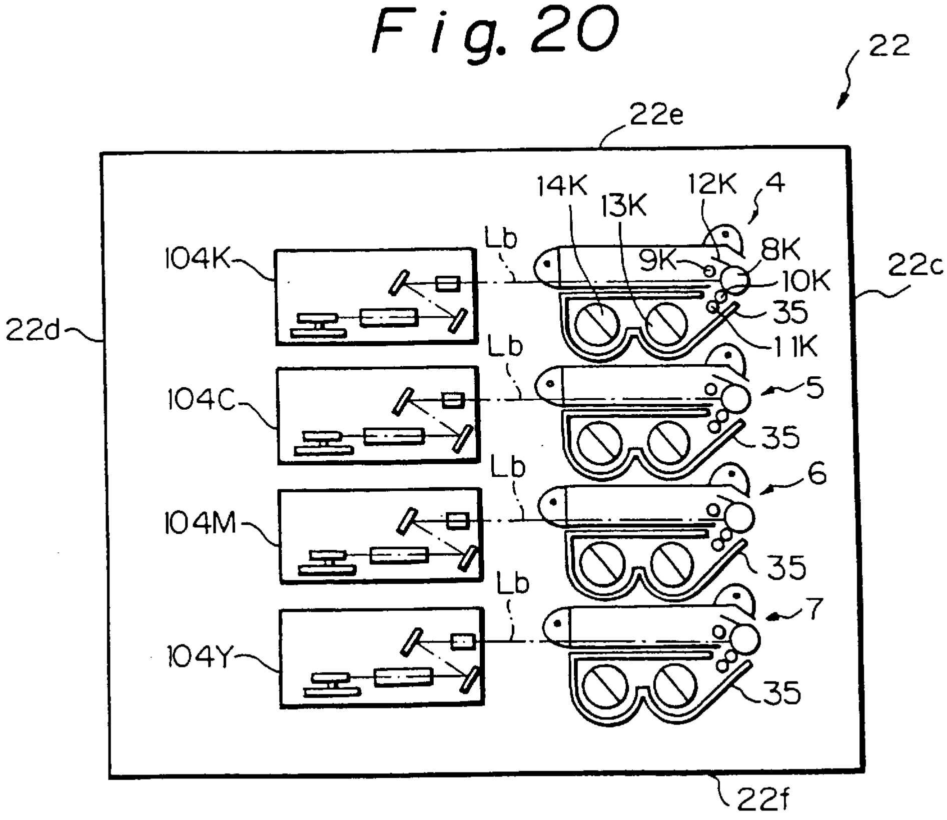
FIG. 20 is a fragmentary view showing a second example of the third embodiment.

Specifically, as shown in FIG. 20, casings 35 indicated by bold lines each accommodate the respective image forming means. In this example, as for the cartridge 4, the developing roller 10K, supply roller 11K and rotary bodies 13K and 14K are the image forming means received in the casing 35. On the other hand, the charge roller 9K and cleaning blade 12K are mounted on the cartridge 4 as the other image forming means. Because the developing roller 10K, supply roller 11K and rotary bodies 13K and 14K are positioned below the charge roller 9K and cleaning blade 12K, the casing 35 effectively separates the cartridges 4 and 5 from each other. This is also true with the other cartridges 6 and 7.

Because the charge roller 9K and cleaning blade 12K include parts that should be replaced at relatively short intervals, they are constructed into the cartridge 4 removable from the apparatus body 22. By contrast, the developing roller 10K, supply roller 11K and rotary bodies 13K and 14K withstand repeated use over a relatively long period of time. These members 10K, 11K, 13K and 14K can therefore be fixedly connected to the apparatus body 22 only if means for replenishing toner from the outside is provided. This is true with the casings 35 associated with the other cartridges 5, 6 and 7. By using the casing 35 as partitions, it is possible to reinforce the structural body and prevent the cartridges 4–7 from vibrating.

The casings 35 each have a roll-like configuration surrounding the developing means, e.g., the developing roller 10K, supply roller 11K and rotary bodies 13K and 14K. Each casing 35 extends in the front-and-rear direction and has its front end and rear end affixed to the front wall 22*a* and rear wall 22*b*, respectively. The casings 35 are therefore implemented as a single structural body together with the apparatus body. Such a structural body has sufficient strength and prevents the cartridges 4–7 from vibrating more positively.

The casings 35 intervening between the cartridges 4–7 not only separate the cartridges 4–7 from each other, but also serve as casings surrounding the image forming means. This configuration further enhances the simple and miniature construction while obviating banding, compared to the configuration using the structural members 25 for partition.

Figure 21:
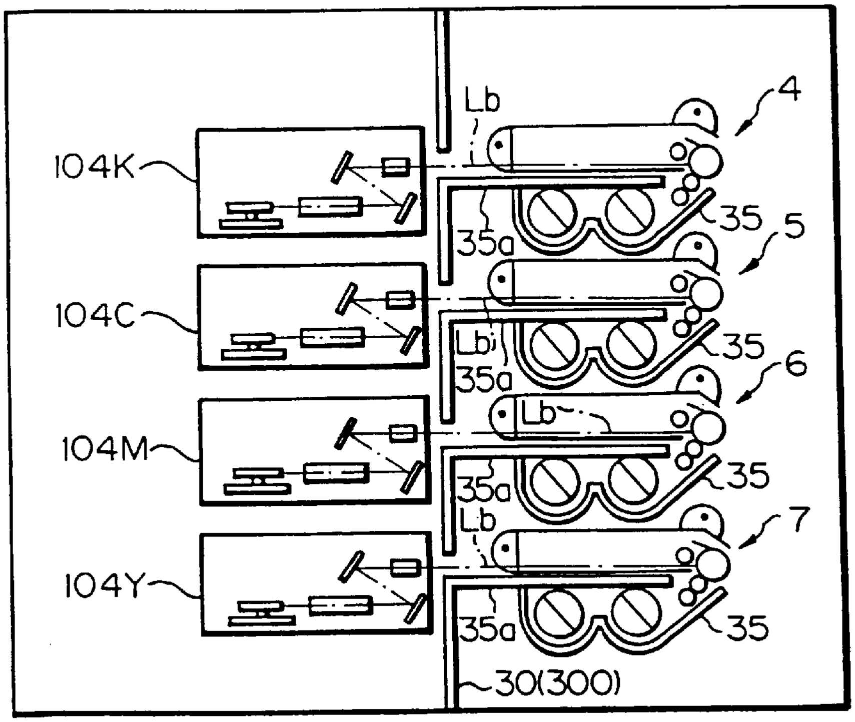
FIG. 21 is a fragmentary front view showing a modification of the second example shown in FIG. 20.

FIG. 21 shows a modification of the above example. As shown, each casing 35 has an extension 35*a* affixed to the vertical stay 30 shown in FIGS. 5A, 5B and 19. This modification further increases the strength of the structural body.

While the casings 35 each accommodate the respective developing means, they may accommodate any other suitable image forming means.

EXAMPLE 3

In the examples shown in FIGS. 9–18, the optical writing means 10K–104Y are respectively provided with the adjusting means 330K–330Y for correcting the shift of scanning lines. The adjusting means 330K–330Y each are positioned outside of the respective housing accommodating the writing means and operated to move the housing. The problem with this configuration is that the housings themselves cannot be used as the structural members 202. A third example to be described accommodates each adjusting means in the housing so as to use the housing as the structural member 202. Let the writing means each including the respective adjusting means and accommodated in the respective housing be labeled 104K', 104C', 104M' and 104Y'. Because the writing means 104K'–104Y' are identical in construction, the following description will concentrate on the writing means 104K' by way of example.

Figure 22:
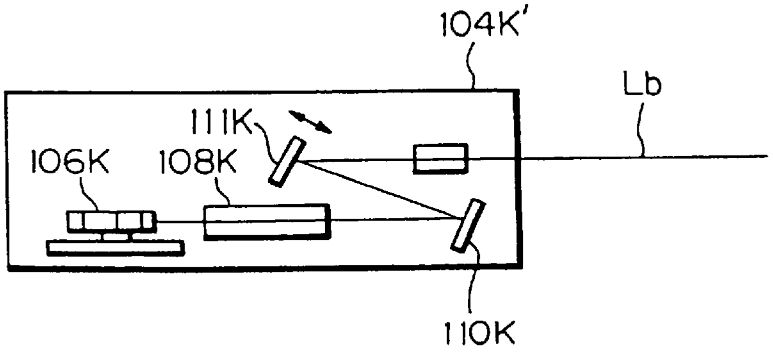
FIG. 22 is a fragmentary front view showing an image forming cartridge representative of a third example of the third embodiment.
Figure 23:
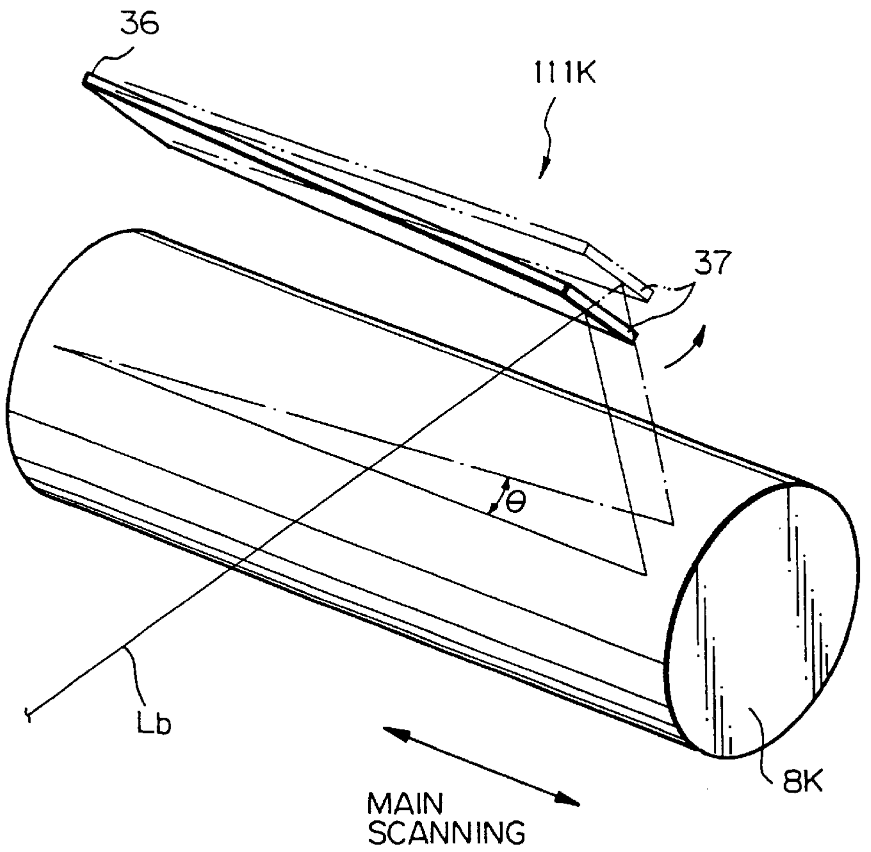
FIGS. 23 and 24 are respectively a perspective view and a front view showing how the inclination of a scanning line is corrected.
Figure 24:
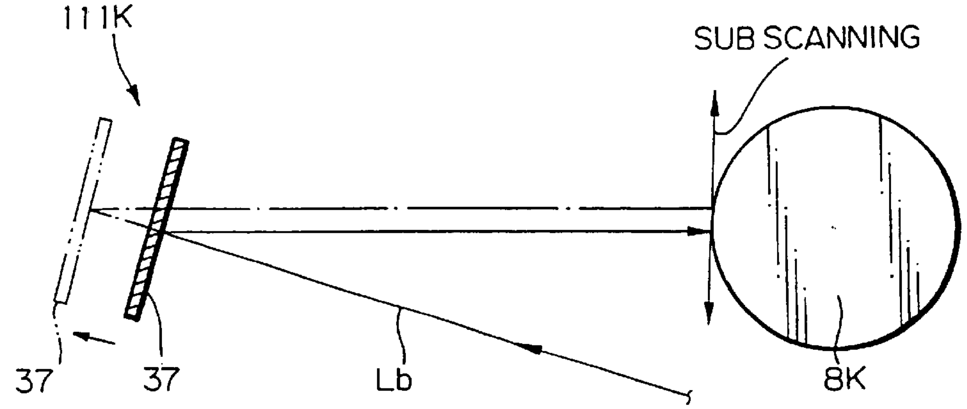

As shown in FIG. 22, the housing of the writing means 104K' accommodates the polygonal mirror 106K, first f-θ lens 108K and mirrors 110K and 111K, as stated earlier. As shown in FIGS. 23 and 24, one end 37 of the mirror 111K in the lengthwise direction corresponding to the main scanning direction of the light beam Lb is movable by any desired angle about the other end 36. When the mirror 111K is so moved, the scanning line formed by the light beam Lb on the drum 8K is shifted in the subscanning direction at a position corresponding to the above end 37 of the mirror 111K; the entire scanning line is inclined by, e.g., an angle θ. Holding means that will be described holds the mirror 111K at such an adjusted position. The holding means constitutes the adjusting means.

Figure 25A:
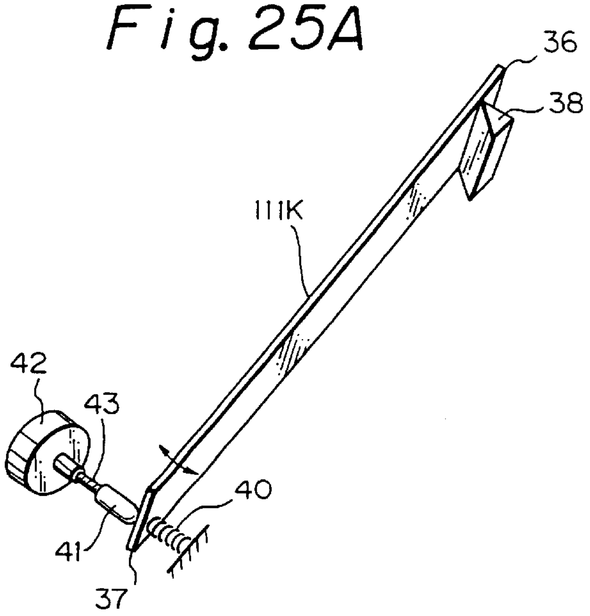
FIG. 25A is a perspective view showing holding means assigned to a mirror.
Figure 25B:
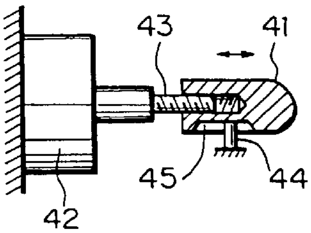
FIG. 25B is a fragmentary sectional view of the holding means.

As shown in FIG. 25A, one surface of the mirror 111K is supported by a knife edge 38 in the vicinity of the end 36 in such a manner as to be movable while maintaining a beam reflection angle. The above surface is constantly biased by a compression spring or resilient means 40 in the vicinity of the other end 37. The other surface of the mirror 111K is pressed by a moving member 41. As shown in FIG. 25, the moving member 41 is a kind of a nut and held in threaded engagement with a screw 43 rotatable coaxially with the output shaft of a motor 42. A groove 45 is formed in the side of the moving member 41 and elongate in the axial direction of the member 41. A detent 44 is received in the groove 45.

The knife edge 38, spring 40, moving member 41, motor 42, screw 43 and detent 44 constitute the holding means mentioned earlier and playing the role of the adjusting means. When the motor 42 is driven, the mirror 111K is angularly moved about the knife edge 38 and then locked at the adjusted position.

The above adjusting means associated with the mirror 111K can be received in the housing of the writing means 104K'. Therefore, the housing of the writing means 104K' can be bodily mounted to the apparatus body 22 in a static condition and can therefore replace the structural member 202 for partition.

Figure 26:
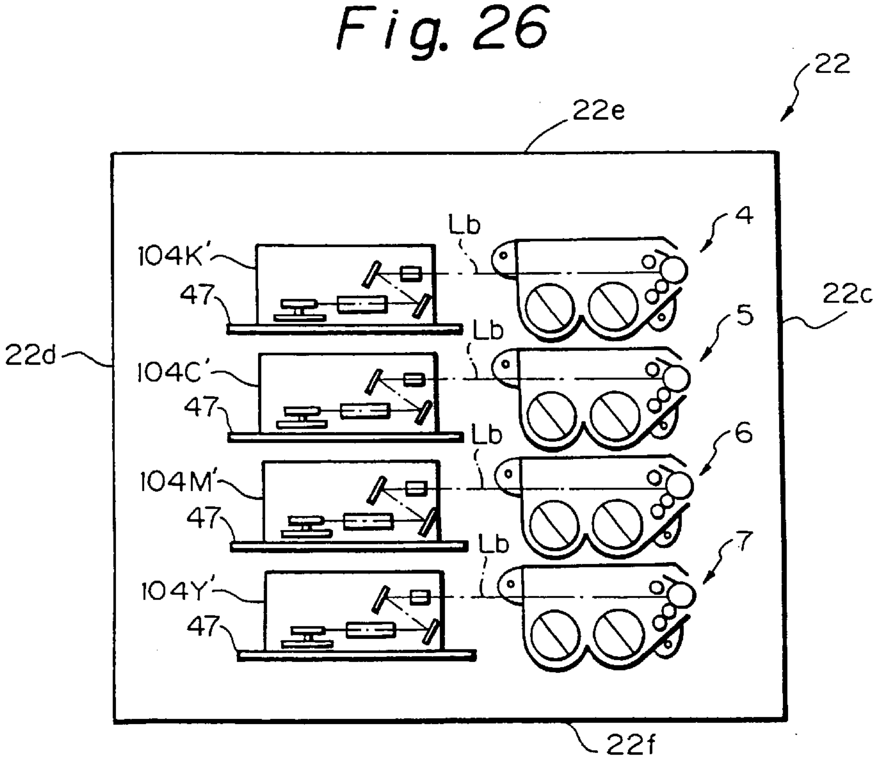
FIG. 26 is a fragmentary front view showing a modification of the third example shown in FIG. 22.

FIG. 26 shows the writing means 104K'–104H' each having the adjusting means arranged in the respective housing. As shown, the housings each have a bottom plate 47 having a greater size or grater rigidity than the usual bottom plate and connected to the front wall 22*a* and rear wall 22*b* at opposite ends. With this configuration, this example realizes a structure simpler and smaller than the structures of the examples shown in FIGS. 9–19.

Figure 27:
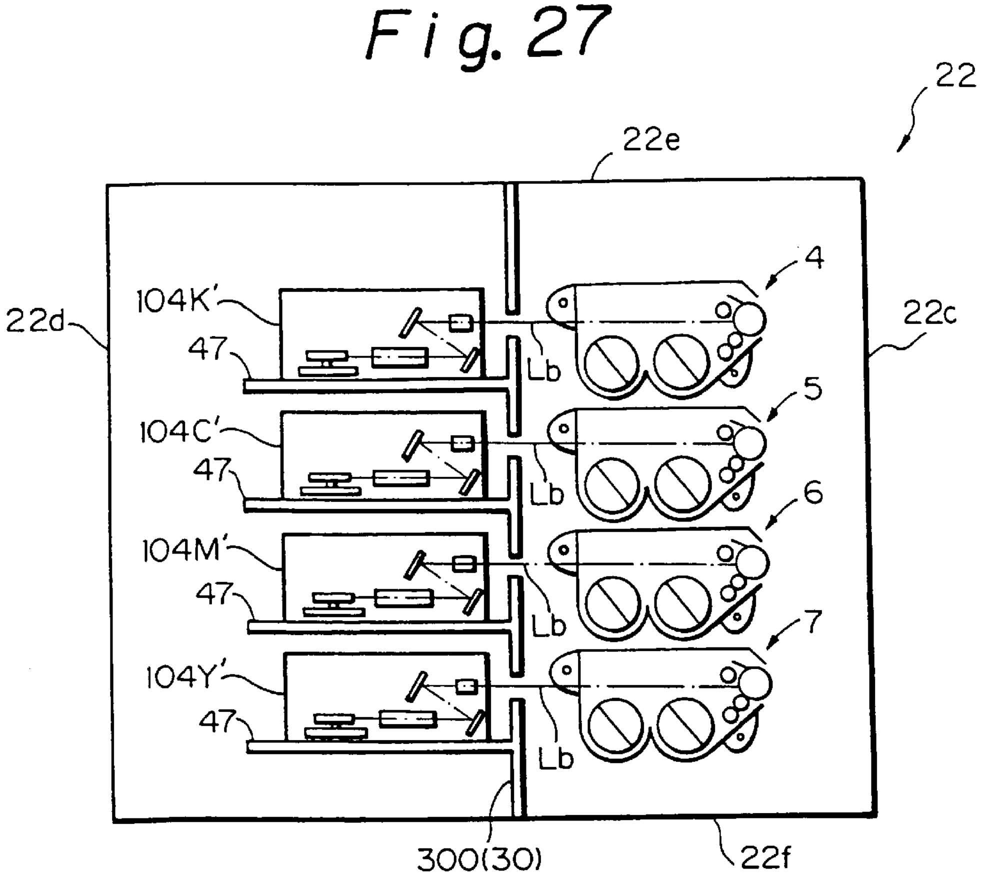
FIG. 27 is a fragmentary front view showing another modification of the example shown in FIG. 22.

As shown in FIG. 27, the bottom plates 47 of the writing means 104K'–104Y' may be connected to the vertical stay 300 in the same manner as in FIGS. 8 and 16. The stay 300 is connected to the top wall 22*e* at the upper end, connected to the bottom wall 22*f* at the lower end, connected to the front wall 22*a* at the front end, and connected to the rear wall 22*b* at the rear end. If desired, the structural members 25 shown in FIG. 18 may also be connected to the stay 300.

EXAMPLE 4

Figure 28:
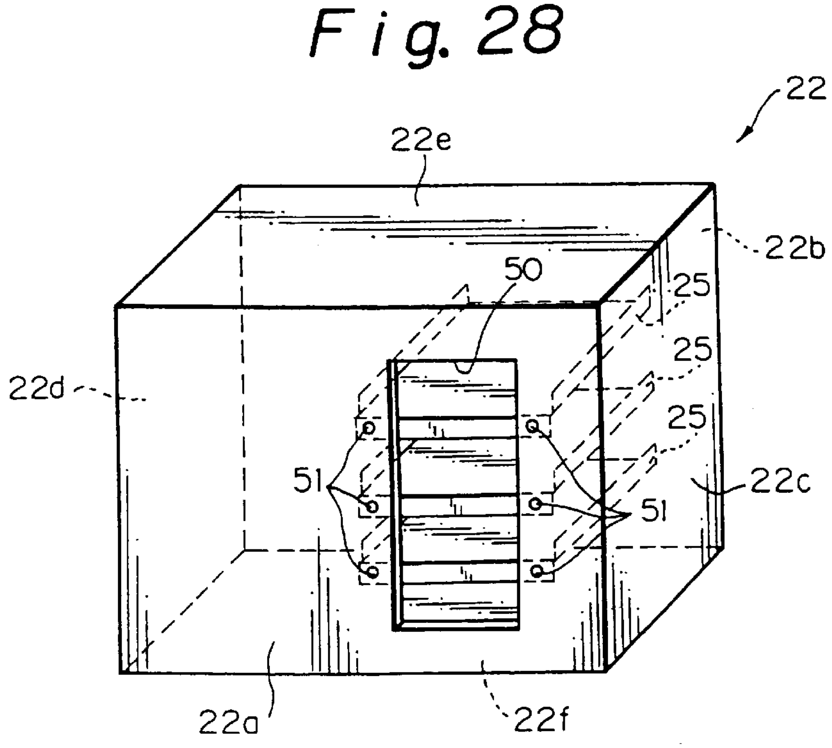
FIG. 28 is a perspective view showing an apparatus body representative of a fourth example of the third embodiment.

FIG. 28 shows a fourth example of the illustrative embodiment using the horizontal stays 25 described with reference to FIGS. 1A–6. As shown, the apparatus body or frame 22 has the front wall 22*a*, rear wall 22*b*, right side wall 22*c*, left side wall 22*d*, top wall 22*e*, and bottom wall 22*f*. The stays 25 are arranged one above the other in the apparatus body 22 for separating the cartridges 4–7. The drums 8K–8Y included in the cartridges 4–7, respectively, extend perpendicularly to the front wall 22*a*. A single opening 50 is formed in the front wall 22*a* and broad enough to accommodate the cartridges 4–7, so that the cartridges 4–7 can be mounted and dismounted in the axial direction of the drums 8K–8Y. The front ends of the stays 25 are affixed to the edges of the opening 50 by screws or fastening means 51 while traversing the opening 50 in the right-and-left direction.

The stays 25 traversing the opening 50 of the front wall 22*a* reinforce the front wall 22*a*. This prevents the rigidity of the front wall 22*a* and therefore the rigidity of the entire frame from decreasing and thereby obviates banding.

Figure 29:
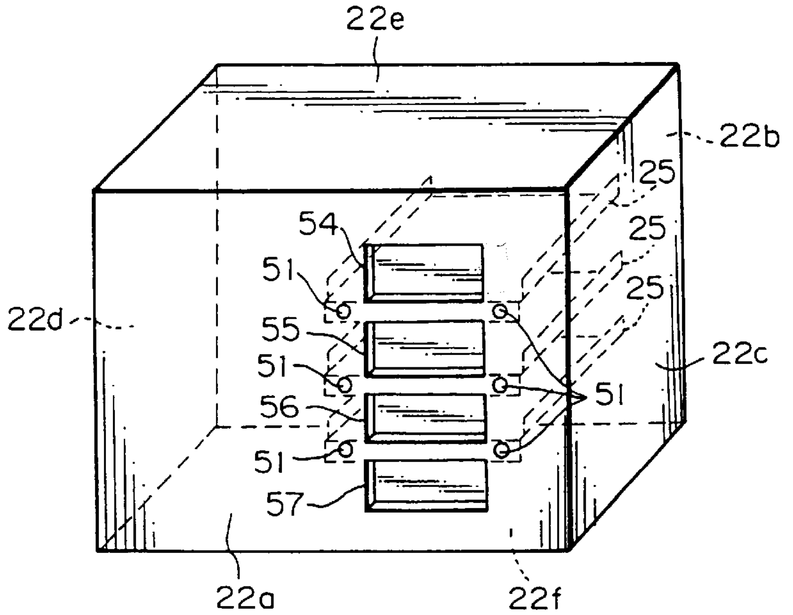
FIG. 29 is a perspective view showing a modification of the fourth example shown in FIG. 28.

FIG. 29 shows a modification of the above example. As shown, the front wall 22*a* of the frame is formed with openings 54, 55, 56 and 57 in place of the single opening 50 of FIG. 29. The openings 54–57 are assigned to the cartridges 4–7, respectively. Part of the front wall 22*a* are left in the form of ribs between the openings 54–57, as illustrated. The front ends of the stays 25 are respectively affixed to the ribs by the screws 51. The rigidity of such a front wall 22*a* decreases little because each opening is small and because a rib intervene between nearby openings, compared to the front wall 22*a* shown in FIG. 28. This, coupled with the fact that the stays 25 reinforce the front wall 22*a*, insures the rigidity of the frame and obviates banding more positively.

EXAMPLE 5

Figure 30:
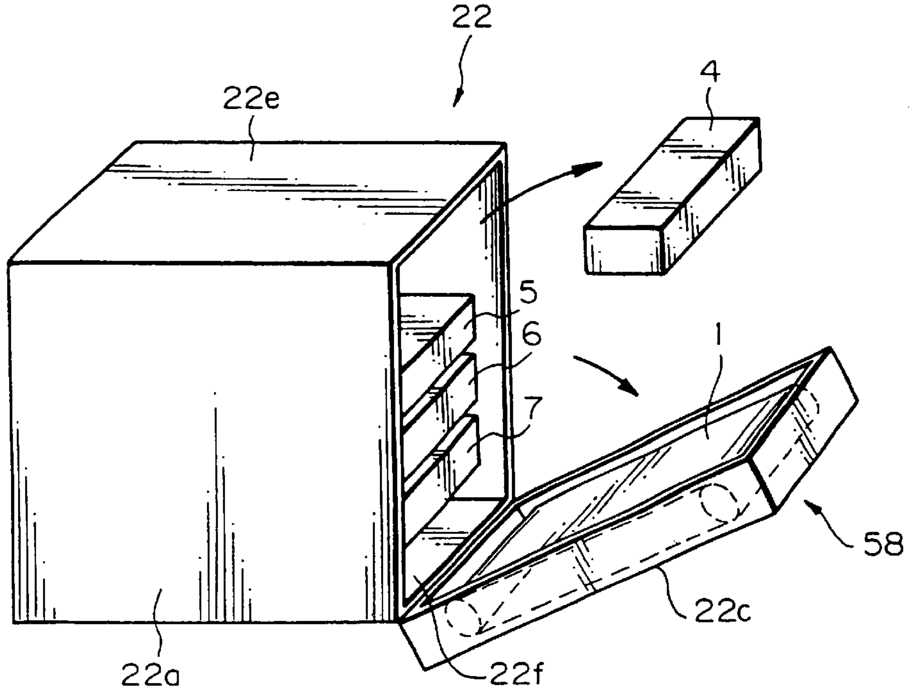
FIG. 30 is a perspective view showing an apparatus body representative of a fifth example of the third embodiment.

FIG. 30 shows a fifth example of the illustrative embodiment also using the horizontal stays 25 described with reference to FIGS. 1A–6. As shown, the stays 25 for separating the cartridges 4–7 are arranged one above the other in the frame also made up of the six walls 22*a*–22*f*. The right side wall 22*c* extends perpendicular to the axial direction of the drums 8K–8Y in a horizontal plane. The transfer belt 1 shown in FIG. 9 is disposed in the side wall 22*c*. The entire side wall 22*c* is implemented as a cover 58 surrounding the belt 1 and openable away from the frame.

Specifically, the lower end of the cover 58 is connected to the bottom wall 22*f* by a hinge or a shaft. As shown in FIG. 30, when the cover 58 is opened away from the frame, the entire area corresponding to the side wall 22*c* is uncovered and allows the cartridges 4–7 to be easily mounted and dismounted therethrough. FIG. 30 shows the cartridge 4 pulled out of the frame.

Figure 31:
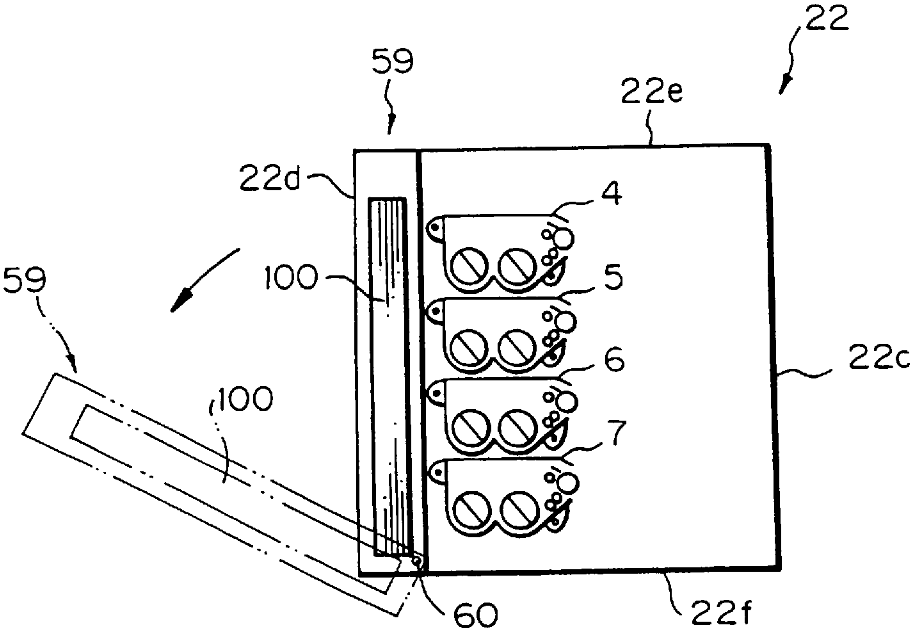
FIG. 31 is a perspective view showing a modification of the fifth example shown in FIG. 30.

FIG. 31 shows a modification of the above example. In the foregoing examples, the writing means 104K–0104Y or 104K'–104Y' and vertical stay 30 or 300 are arranged at the left-hand side of the cartridges 4–7, so that the cartridges 4–7 cannot be mounted or dismounted via the position where the left side wall 22*d* is present. The modification of FIG. 31 is constructed to allow the cartridges 4–7 to be mounted and dismounted via the above position.

Specifically, in the modification, a single optical writing unit 100 in the form of a flat box is substituted for the writing means 104K–104Y or 104K'–104Y'. The writing unit 100 is arranged in a cover 59 mainly constituted by the left side wall 22*ds*. The cover 59 is openable away from the frame about a shaft 60. When the cover 59 is opened, as indicated by a dash-and-dots line in FIG. 31, it uncovers the area corresponding to the left side wall 22*d* and allows the cartridges 4–7 to be easily mounted and dismounted.

In any case, the side wall of the frame extending perpendicularly to the axial direction of the drums in a horizontal plane is bodily implemented as an openable cover. It is therefore not necessary to form the front wall 22*a* with an opening or openings (FIG. 28 or 29) which would reduce the rigidity of the structural body and result in banding.

EXAMPLE 6

Figure 32:
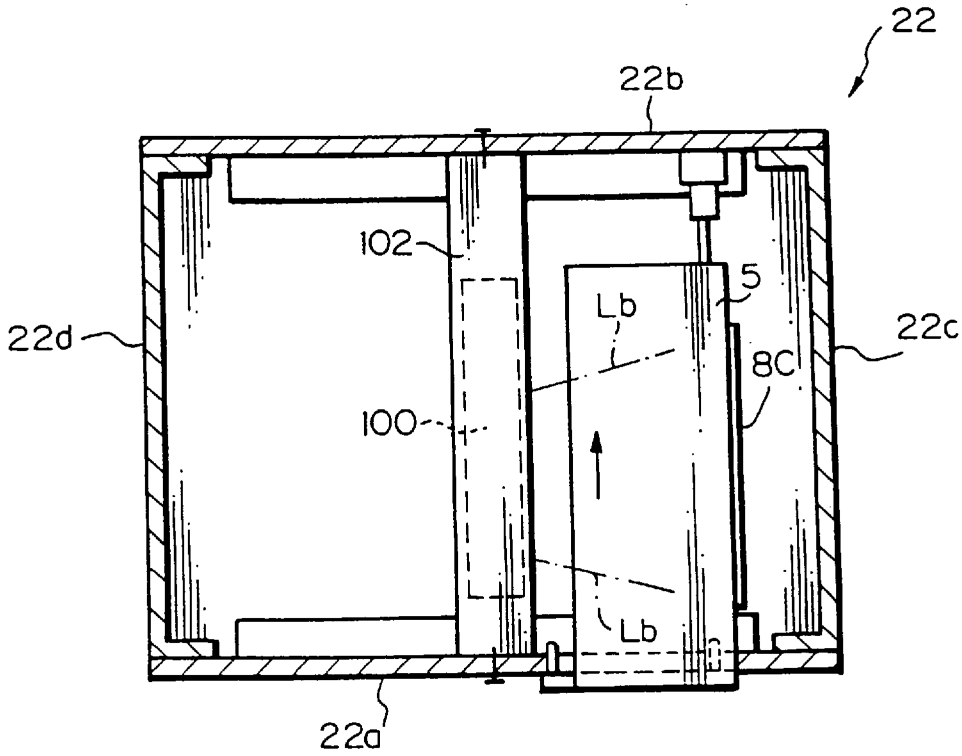
FIG. 32 is a fragmentary view showing a sixth example of the third embodiment.
Figure 33:
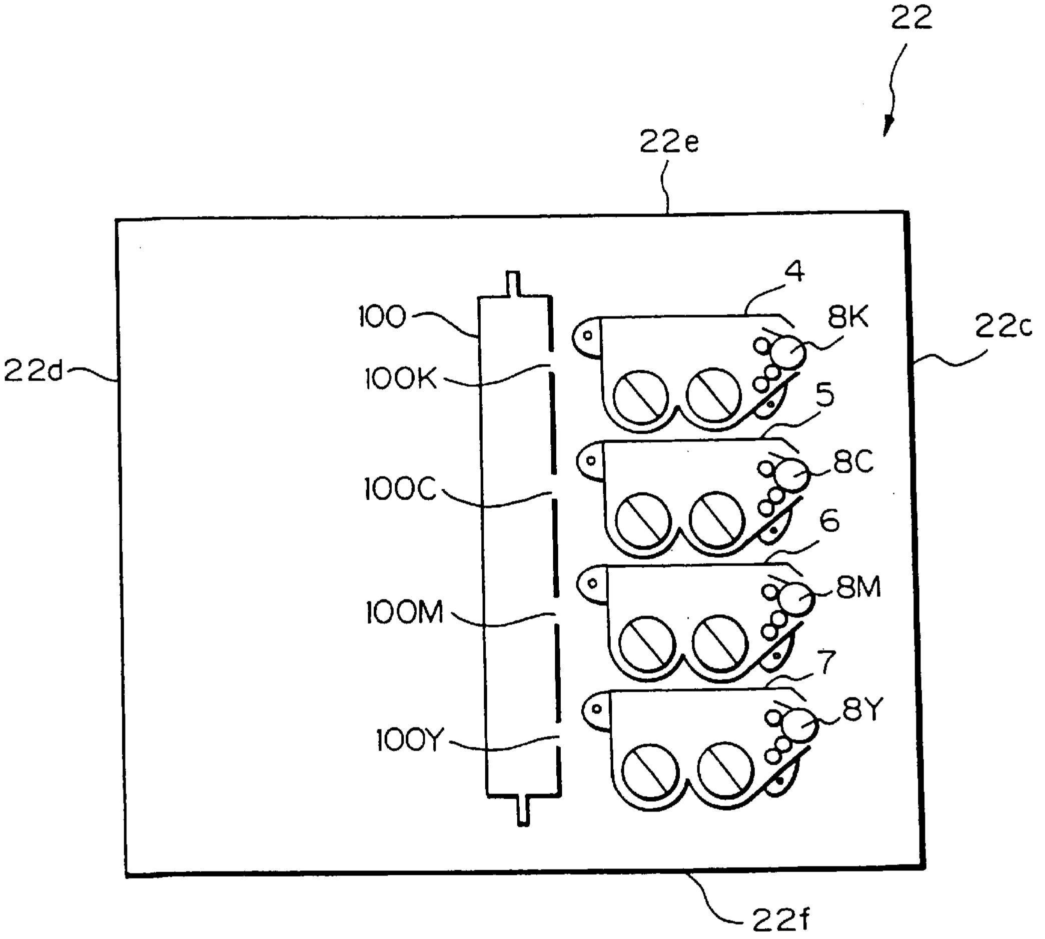
FIG. 33 is a fragmentary front view showing the sixth example shown in FIG. 32.

This example, like the above example, includes the box-like writing unit 100. As shown in FIGS. 32 and 33, the writing unit 100 is affixed to a structural body 102 which is affixed to the front wall 22*a* and rear wall 22*b* at its opposite ends. The cartridges 4–7 are stacked one above the other and affixed to the apparatus body 22.

The writing unit 100 is formed with openings 100K, 10C, 10M and 100Y respectively aligning with the drums 8K–8Y of the cartridges 4–7 for passing the light beams Lb therethrough. The writing unit 100 is located at a preselected distance from the drums 8K–8Y.

The single writing unit 100 is easier to position than the four writing means 104K–104Y shown in FIG. 9 and reduces the overall size of the apparatus. Further, the single writing unit 100 allows reinforcing members to be easily added for increasing rigidity. In addition, the flat writing unit 100 reduces the space to be occupied to the apparatus.

EXAMPLE 7

Figure 34A:
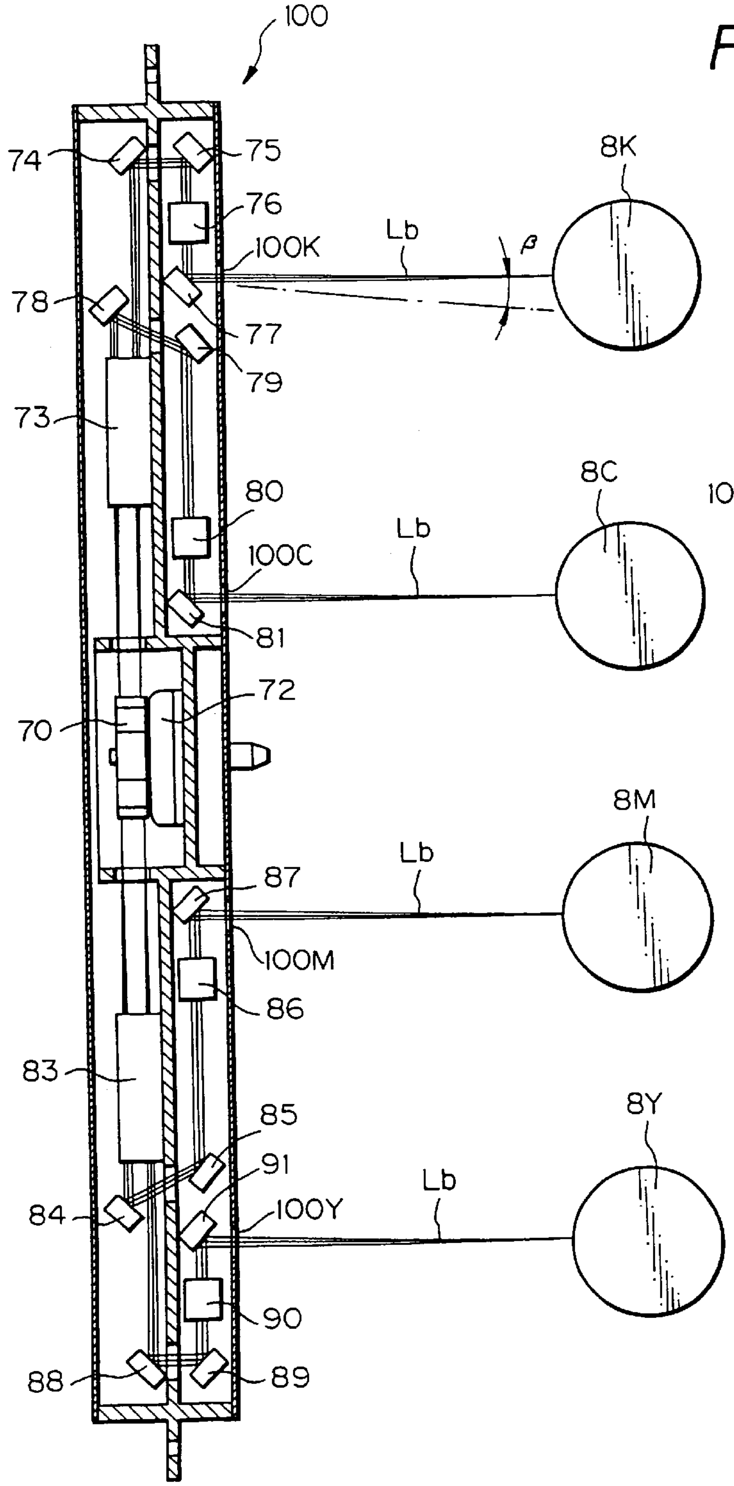
FIG. 34A is a sectional view showing the structure of a writing unit included in a seventh example of the third embodiment and a positional relation between it and photoconductive elements.
Figure 34B:
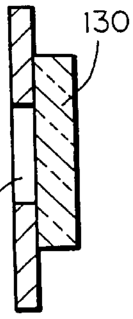
FIG. 34B is a fragmentary sectional view showing a dust-proof glass included in the seventh example shown in FIG. 34A.

FIGS. 34A and 34B show a seventh example of the illustrative embodiment and relating to the configuration of the writing unit 100 described with reference to FIGS. 31–33. As shown in FIG. 34A, a polygonal mirror 70 is positioned at the center of the writing unit 100 and constitutes a polygon scanner. A motor 72 causes the polygonal mirror 70 to rotate. The mirror 70 has an axis of rotation extending perpendicularly to the axial direction of the drums 8K–8Y.

Four light sources, not shown, are arranged in the writing unit 100. The light sources are respectively modulated by image signals representative of cyan, magenta, yellow and black. The resulting light beams issuing from the light sources are incident to four points on the polygonal mirror 70. The mirror 70 steers the incident light beams in the direction perpendicular to its axis of rotation. The drums 8K–8Y are stacked in the direction in which the mirror 70 steers the incident light beams.

The light beam representative of a black component and steered by the polygonal mirror 70 is incident to the drum 8K via an f-θ lens 73, mirrors 74 and 75, an elongate lens 76, a mirror 77 and the opening 100K. The light beam representative of a cyan component and steered by the polygonal mirror 70 is incident to the drum 8C via the f-θ lens 73, mirrors 78 and 79, an elongate lens 80, a mirror 81 and the opening 100C. The light beam representative of a magenta component and steered by the polygonal mirror 70 is incident to the drum 8M via an f-θ lens 83, mirrors 84 and 85, an elongate lens 86, a mirror 87 and the opening 100M. Further, the light beam representative of a yellow component and steered by the polygonal mirror 70 is incident to the drum 8Y via the f-θ lens 83, mirrors 88 and 89, an elongate lens 90, a mirror 91 and the opening 100Y. As shown in FIG. 34B, the openings 100K–100Y each are covered with a dust-proof glass 130.

As stated above, in the writing unit 100, the polygonal mirror 70 steers the incident light beams in the same direction as the direction in which the drums 8K–8Y are stacked. The writing unit 100 can therefore be implemented as a single horizontally flat box and can reduce the space requirement, compared to the four writing means 104K–104Y shown in FIG. 9. Moreover, the number of polygonal mirrors that generate heat is reduced from four to one, so that temperature inside the apparatus can be maintained low.

EXAMPLE 8

Figure 35:
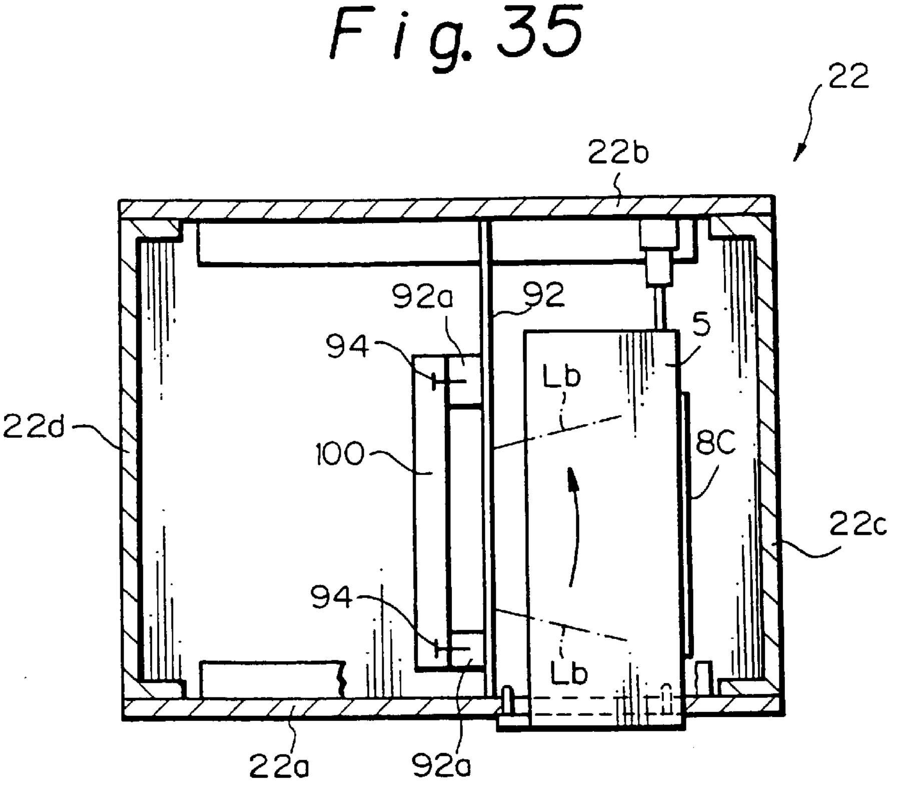
FIG. 35 is a fragmentary plan view showing a ninth example of the third embodiment.
Figure 36:
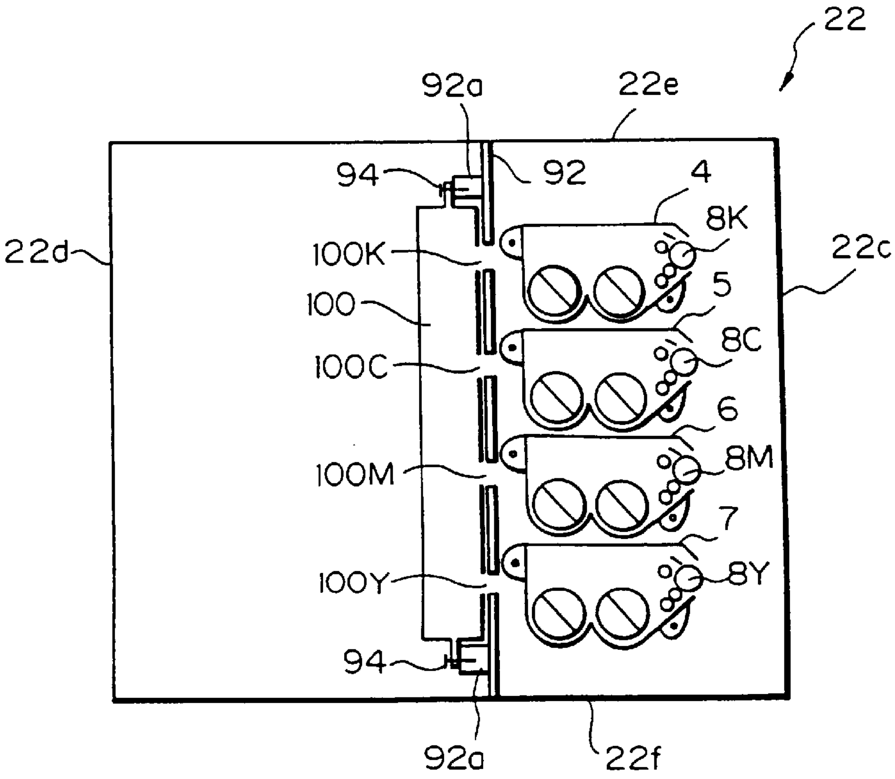
FIG. 36 is a fragmentary front view of the ninth example shown in FIG. 35.

FIGS. 35 and 36 show an eighth example of the illustrative embodiment relating to an arrangement for mounting the writing unit of FIGS. 34A and 34B to the apparatus. As shown, a flat structural member 92 for supporting the writing unit 100 extends in parallel to the direction in which the cartridges 4–7 are stacked, i.e., in the up-and-down direction. The structural member 92 is affixed to the front wall 22*a*, rear wall 22*b*, top wall 22*e* and bottom wall 22*f*.

The structural member 90 includes four seats 92*a*. The writing unit 100 is mounted to the seats 92*a* by bolts or mounting means 94. In this configuration, the writing unit 100 and drums 8K–8Y are held at a preselected distance from each other. The seats 92*a* may be omitted, if desired.

The structural member 92 affixed to the walls 22*a*, 22*b*, 22*e* and 22*f* of the frame increases the rigidity of the entire apparatus body 22. This, coupled with the fact that the writing unit 100 is mounted on the structural member 92, effectively obviates banding.

EXAMPLE 9

In the example shown in FIGS. 35 and 36, the structural member 92 is usually formed of metal while the frame of the writing unit 100 is formed of resin. The polygonal scanner included in the writing unit 100 and constituting a heat source causes the structural member 92 and frame to expand due to heat during operation. When the writing unit 100 thermally expands, the structural member 92 also thermally expands. Because the frame of the writing unit 100 and structural body 92 are different in material and therefore in the coefficient of thermal expansion, the writing unit 92 is apt to deform, i.e., to curve in its intermediate portion without its affixed ends being displaced.

For example, in FIGS. 34A and 34B, assume that the writing unit 100 tends to expand in the up-and-down direction with its upper end lower end being restricted by the structural member 92. Then, the intermediate portion of the writing unit 100 in the up-and-down direction curves away from the drum side. As a result, the mirror 77, for example, is displaced due to the deformation of the writing unit 100, shifting the path of the light beam Lb by an angle β. Although the angle β itself is not great, it is magnified before reaching the drum. Because the shift of the light beam Lb differs from one drum to another drum, image components of different colors expected to form a full-color image are brought out of register and lower image quality. The ninth example to be described is constructed to reduce the displacement of the writing unit 100 as far as possible.

Figure 37:
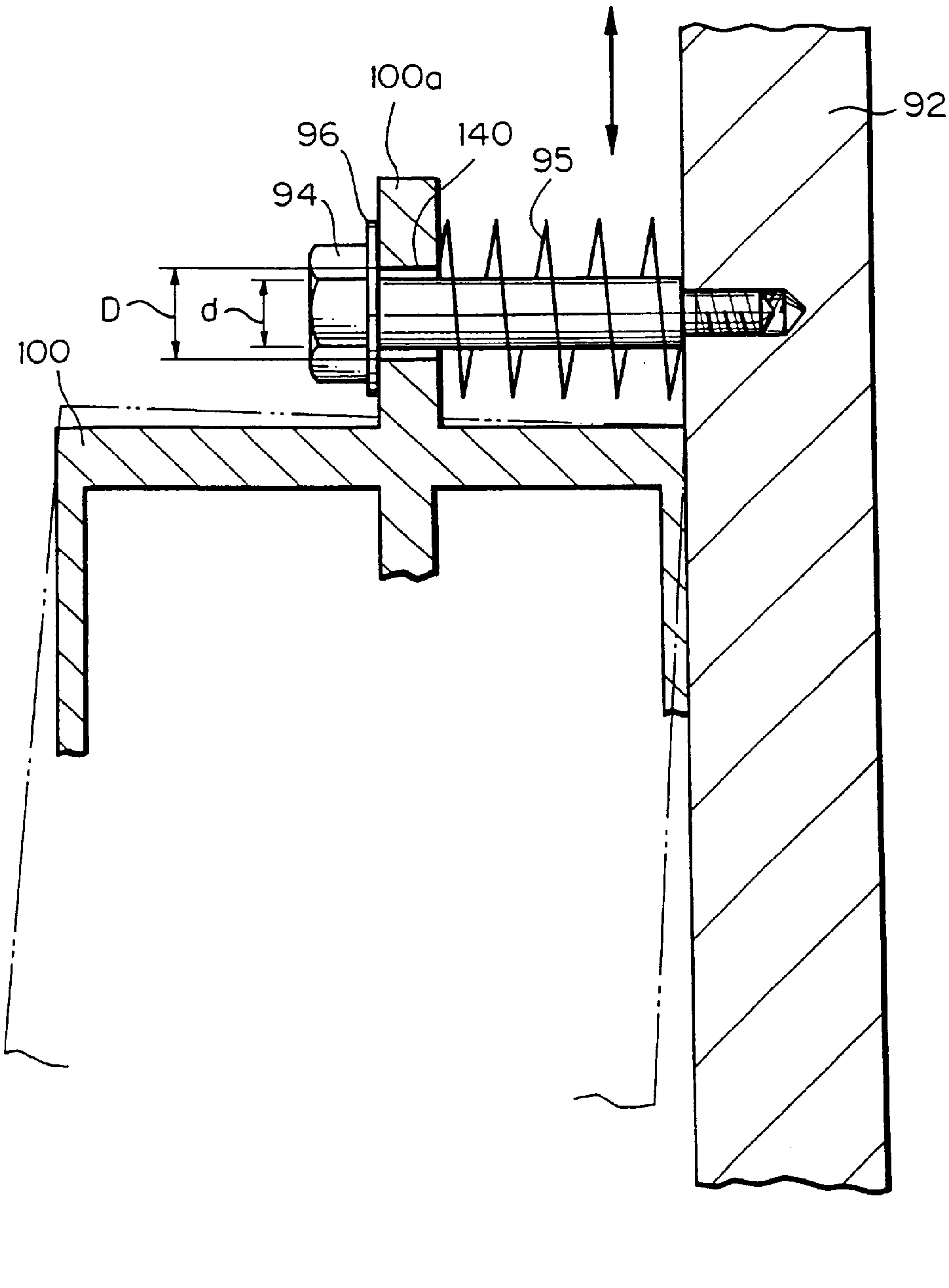
FIG. 37 is a fragmentary sectional view showing a portion for mounting an optical writing unit included in the ninth example of FIG. 35.

Briefly, in this example, the upper and lower ends of the writing unit 100 each are retained by the structural member 92 via a resilient member with a margin with respect to movement in the up-and-down direction. Specifically, as shown in FIG. 37, the writing unit 100 is formed with a seat 100*a* at its upper end. A hole 140 is formed throughout the seat 100*a*. A bolt 94 is passed through the opening 140 with the intermediary of a resilient washer 96 and screwed into the structural member 92. A compression spring 95 is loaded between the structural member 92 and the seat 100*a*. The hole 140 has a diameter D greater than the diameter d of the bolt 94, implementing a margin for the writing unit 100 to move up and down. The above configuration is also applied to the lower end of the writing unit 100.

In the above construction, when the writing unit 100 thermally expands during operation, it is capable of moving in the up-and-down direction within the range of the difference between the diameters D and d. It follows that the writing unit does not curve, as indicated by a dash-and-dots line in FIG. 37, but simply expands in the up-and-down direction. This is successful to reduce the displacement of the light beam Lb.

Figure 38:
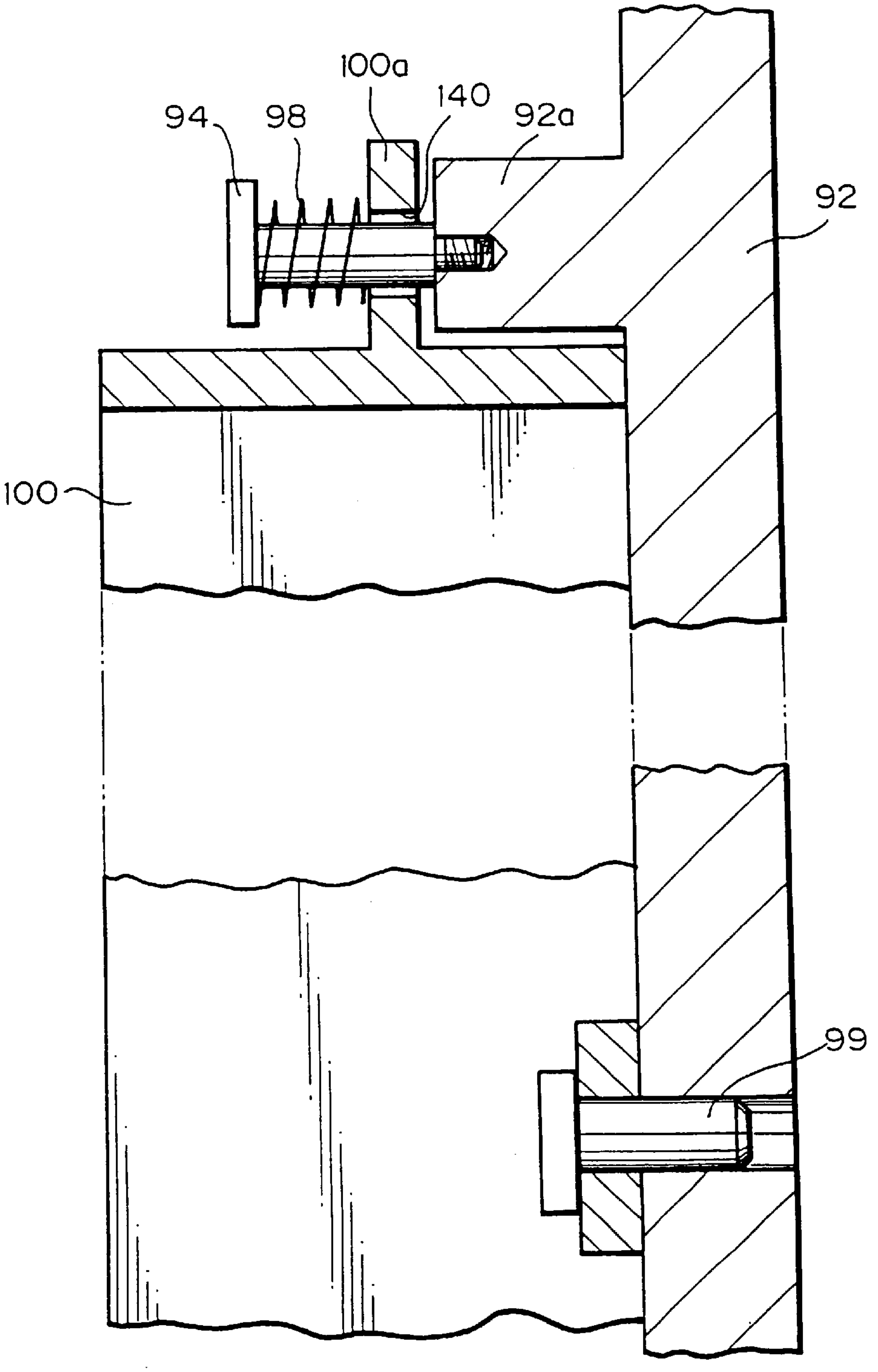
FIG. 38 is a view similar to FIG. 37, showing a modification of the portion of FIG. 37.

FIG. 38 shows a modification of the above example. As shown, a bolt 97 is screwed into the seat 92 included in the structural member 92. A spring or resilient member 98 is loaded between the seat 100*a* and the head of the bolt 94. Again, the hole 140 has a greater diameter than the bolt 97 so as to provide the writing unit 100 with a margin with respect to movement in the up-and-down direction.

The above example and its modification each elastically fasten the structural member 92 and writing unit 100 and provide the writing unit 100 with the above margin, thereby reducing the displacements of the light beams which would bring colors out of register.

EXAMPLE 10

The configurations described with reference to FIGS. 35 and 38 free the writing unit 100 from curve-like deformation, but cannot fully obviate the displacement in the up-and-down direction. A tenth example to be described further reduces the displacement in the up-and-down direction.

Figure 39:
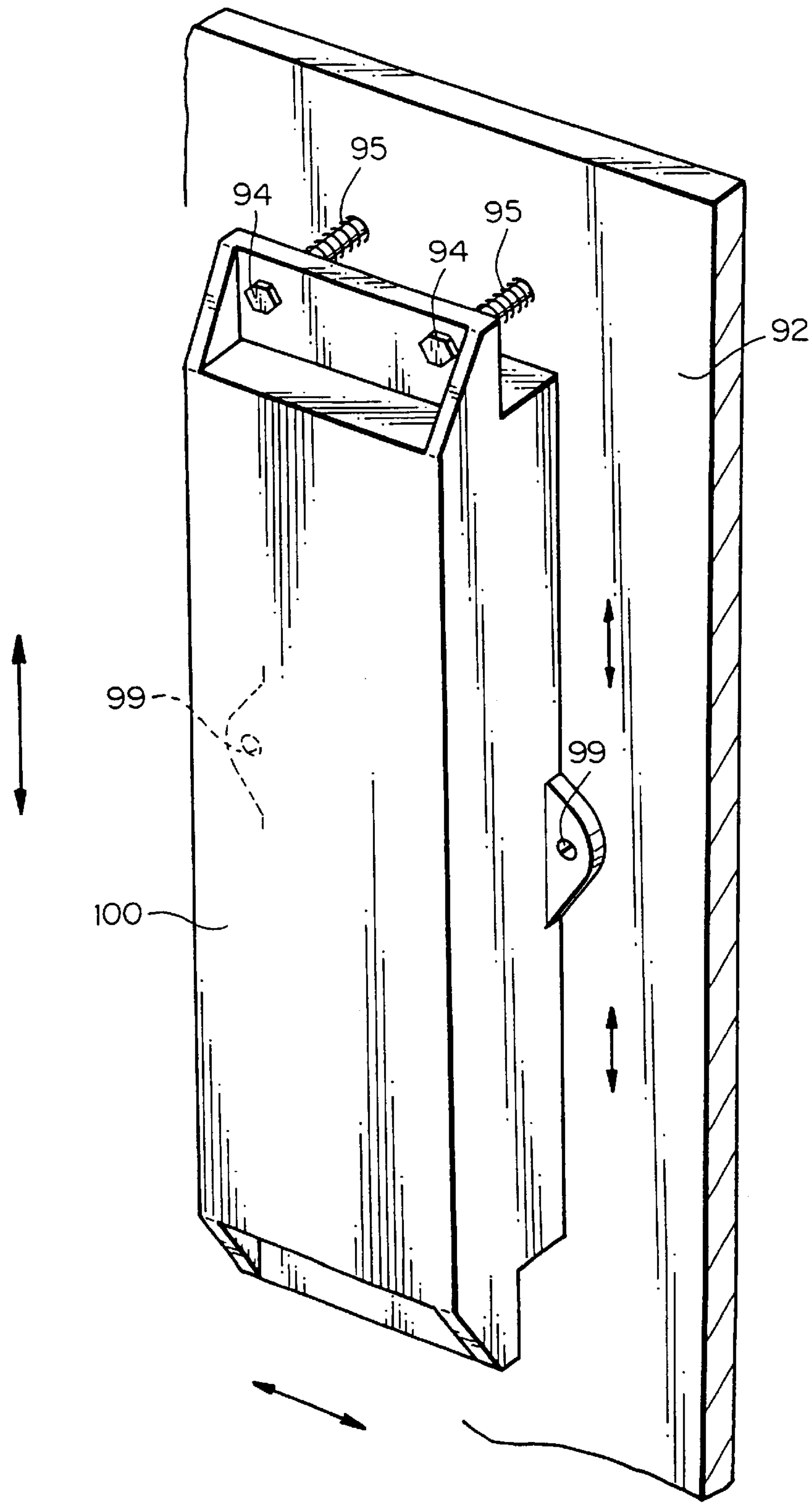
FIG. 39 is a perspective view showing how an optical writing unit is mounted in a tenth example of the third embodiment.
Figure 40:
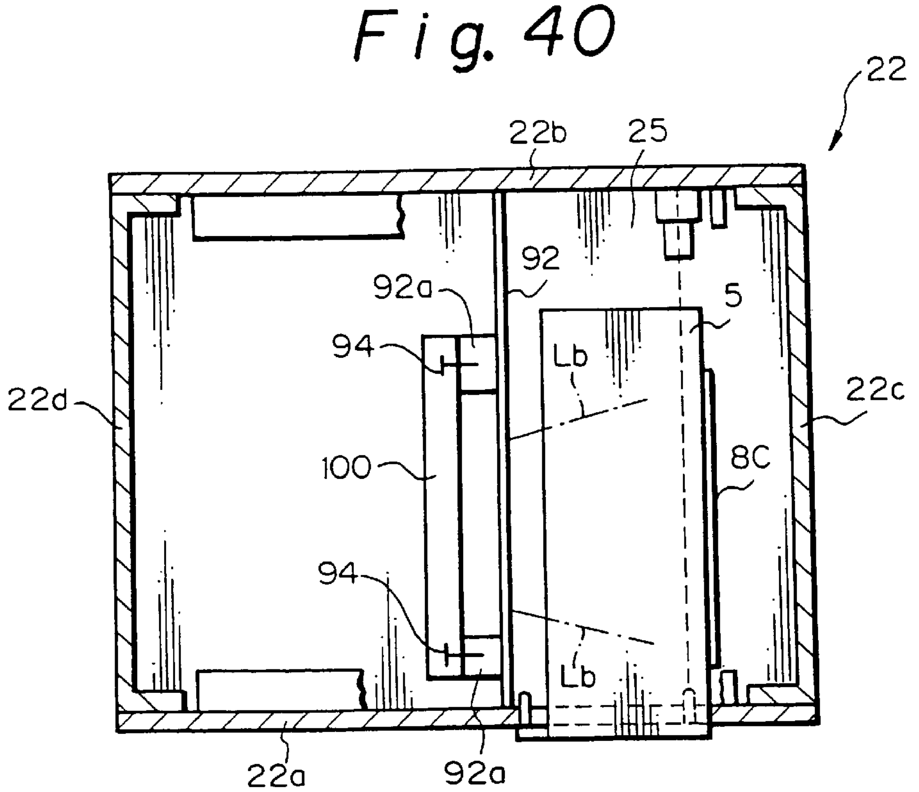
FIG. 40 is a fragmentary plan view showing an eleventh example of the third embodiment.
Figure 41:
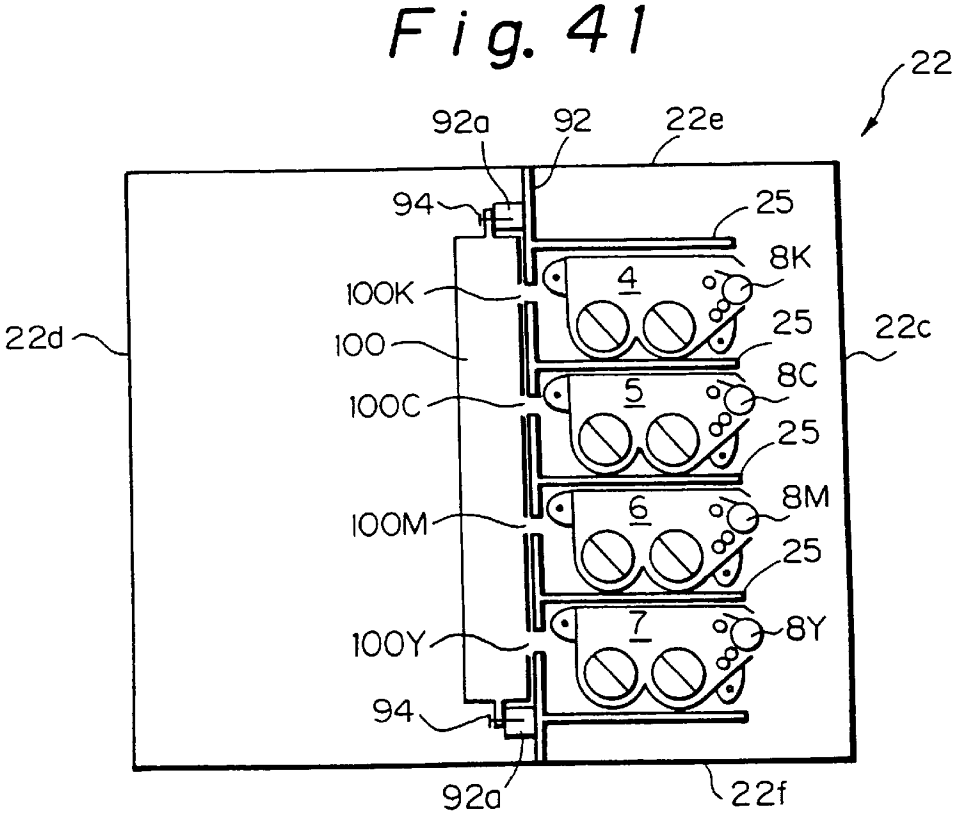
FIG. 41 is a front view of the eleventh example shown in FIG. 40.

Specifically, as shown in FIGS. 38 and 39, the intermediate portion of the writing unit 100 in the up-and-down direction are supported by the structural members 92 at two horizontally spaced points, i.e., via two pins 99. In this condition, the displacement of the writing unit 100 ascribable to thermal expansion is divided into the upper half and lower half. This further reduces irregularity in color ascribable to thermal expansion.

EXAMPLE 11

This example is similar to the example of FIG. 19 and connects the horizontal stays 25 shown in FIGS. 1A–6 and assigned to the cartridges 4–7 to the structural member 92 described with reference to FIGS. 35–39. Specifically, the stays 25 effectively obviating the vibration of the cartridges 4–7 are connected to the structural member 92 perpendicular to the stays 25 and supporting the writing unit 100. The resulting apparatus body 22 achieves greater rigidity and obviates banding more positively.

EXAMPLE 12

Figure 42:
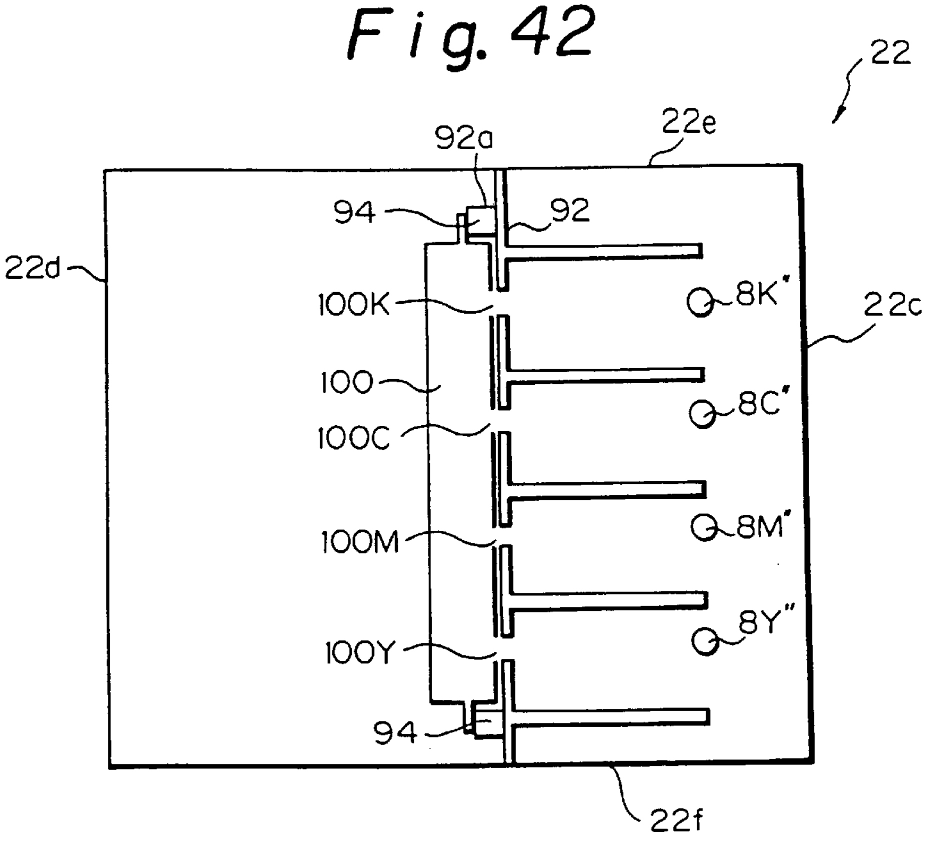
FIG. 42 is a front view showing a twelfth example of the third embodiment.
Figure 43A:
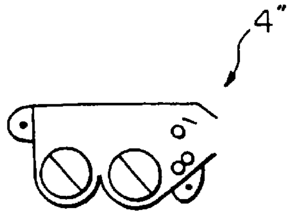
FIGS. 43A–43D are front views each showing a particular image forming cartridge not including a photoconductive element.
Figure 43B:
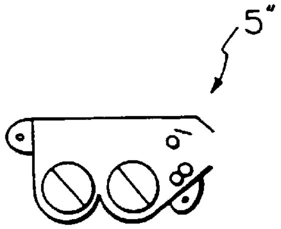
Figure 43C:
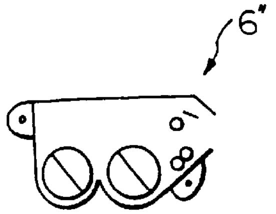
Figure 43D:
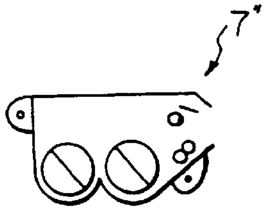

As shown in FIG. 42, photoconductive drums 8K", 8C", 8M" and 8Y" are supported beforehand. As shown in FIGS. 43A–43D, cartridges 4", 5", 6" and 7" do not support any drum. As shown in FIG. 50, when the cartridges 4"–7" are mounted to the apparatus body 22, a part of the image forming means, e.g., the rings 10C"-1 and 10C"-2 (FIG. 50) contact the drum 8C". Even with this type of apparatus, it is possible to increase the rigidity of the apparatus body 22 to thereby obviate banding by connecting the horizontal stays 25 to the structural member 92 of FIGS. 35–39, as shown in FIG. 42.

EXAMPLE 13

This example applies the guides 27K–27Y shown in FIGS. 2A to 2B to the cartridges shown in FIGS. 41–43D.

EXAMPLE 14

This example applies the leaf springs 28U and 28D shown in FIGS. 3A, 3B, 4A, 4B and 6 to the cartridges shown in FIGS. 41–43D.

EXAMPLE 15

This example provides the stays 25 of FIGS. 41–43D with the vibration-proof rubber blocks shown in FIGS. 4A, 4B and 7 and exerting viscoelastic pressing forces.

While the above description has concentrated on the characteristic configurations of the illustrative embodiments, the characteristic configurations may be combined as far as possible in order to further enhance the anti-vibration function.

In summary, it will be seen that the present invention provides an image forming apparatus capable of effectively obviating banding ascribable to the vibration of image forming cartridges and optical writing means and members to which they are affixed. In addition, the image forming apparatus of the present invention is miniature, low cost and easy to operate.

Various modifications will become possible for those skilled in the art after receiving the teachings of the present disclosure without departing from the scope thereof.

What is claimed is:

1. An apparatus, comprising:

a plurality of image forming cartridges containing toner;

a plurality of light generators which generate light on a photoconductive element, the plurality of light generators corresponding to the plurality of image forming cartridges; and a box-shaped housing including respective slots corresponding to the light generators, the slots positioned to allow light beams emitted from said light generators to pass therethrough, the box-shaped housing configured to house the plurality of light generators one above another.

2. An apparatus according to claim 1, wherein:

the plurality of light generators are positioned to emit light through the respective slots to the image forming cartridges.

3. An apparatus according to claim 1, wherein:

the plurality of image forming cartridges respectively correspond on a one-to-one basis with the plurality of light generators.

4. An apparatus according to claim 1, wherein:

the plurality of light generators emit light in a generally horizontal direction to a respective one of said plurality of image forming cartridges.

5. An apparatus according to claim 1, wherein:

the image forming cartridges each include a respective photoconductive drum as the photoconductive element, and the plurality of light generators emit light in a generally horizontal direction to the photoconductive drum of a respective one of said plurality of image forming cartridges.

6. An apparatus according to claim 1, wherein:

the plurality of image forming cartridges each include a photoconductive drum as the photoconductive element.

7. An apparatus according to claim 6, wherein:

the plurality of image forming cartridges develop therein a latent image on the photoconductive drum thereof formed by the respective light generator.

8. An apparatus according to claim 1, wherein:

the plurality of image forming cartridges each contain a different color toner.

9. An apparatus according to claim 1, further comprising:

a vertically arranged belt disposed adjacent to the plurality of image forming cartridges.

10. An apparatus according to claim 1, wherein:

the belt is arranged to convey a medium to each of the plurality of image forming cartridges in order to form an image on the medium.

11. An apparatus according to claim 1, wherein:

the box-shaped housing is configured to house the plurality of light generators without housing the image forming cartridges.

12. An apparatus, comprising:

a plurality of first means for developing and forming images;

a plurality of second means for generating and emitting light on a means for forming a latent image thereon, the means for forming the latent image thereon having the latent image developed by the plurality of first means, the plurality of first means respectively corresponding to the plurality of the second means; and means for housing the plurality of second means one above another, the means for housing including a plurality of respective means for passing light therethrough from respective ones of the second means.

13. An apparatus according to claim 12, wherein:

the plurality of second means are positioned to emit light through the respective means for passing to the plurality of first means.

14. An apparatus according to claim 12, wherein:

the plurality of first means respectively correspond on a one-to-one basis with the plurality of second means.

15. An apparatus according to claim 12, wherein:

the plurality of second means emit light in a generally horizontal direction to a respective one of said plurality first means.

16. An apparatus according to claim 12, wherein:

the plurality of first means each include a respective photoconductive drum as the means for forming a latent image thereon, and the plurality of second means emit light in a generally horizontal direction to the photoconductive drum of a respective one of said plurality of first means.

17. An apparatus according to claim 12, wherein:

the first means each include a photoconductive drum as the means for forming a latent image thereon.

18. An apparatus according to claim 17, wherein:

the plurality of first means develop therein a latent image on the photoconductive drum thereof formed by the respective second means.

19. An apparatus according to claim 12, wherein:

the plurality of first means each contain a different color toner.

20. An apparatus according to claim 12, further comprising:

a vertically arranged means for transferring disposed adjacent to the first means.

21. An apparatus according to claim 12, wherein:

the means for transferring is arranged to convey a medium to each of the plurality of first means in order to form a toner image on the medium.

22. An apparatus according to claim 12, wherein:

the means for housing is for housing the plurality of second means without housing the first means.

23. An image forming apparatus, comprising:

an apparatus body;

a plurality of image forming cartridges arranged one above another and removably mounted to said apparatus body, each including at least one photoconductive element;

a plurality of optical writing devices each configured to form a latent image on a respective one of said photoconductive elements;

a vertical stay disposed between the optical writing devices and the image forming cartridges;

a plurality of image forming cartridge supporting members corresponding to each of the image forming cartridges, and being attached to at least one of the vertical stay and the apparatus body; and a plurality of optical writing device supporting members corresponding to each of the optical writing devices, and being attached to at least one of the vertical stay and the apparatus body.

24. An image forming apparatus according to claim 23, wherein:

the image forming cartridge supporting members, the vertical stay, the optical writing device supporting members, and the apparatus body comprise a single structural body.

25. An image forming apparatus according to claim 23, wherein:

said vertical stay extends from a top to a bottom of the apparatus body.

26. An image forming apparatus according to claim 23, wherein:

said optical writing devices emit a plurality of light beams toward said photoconductive elements through slots included in the vertical stay.

27. An image forming apparatus according to claim 23, wherein:

said optical writing devices are spaced from said photoconductive elements by a predetermined distance.

* * * * *